US008656464B2

(12) United States Patent
Oda et al.

(10) Patent No.: US 8,656,464 B2
(45) Date of Patent: Feb. 18, 2014

(54) COMMUNICATION CONTROLLER AND NETWORK SYSTEM UTILIZING THE SAME

(75) Inventors: Tomohiro Oda, Osaka (JP); Toshinobu Kawasaki, Ibaraki (JP); Makoto Kawasaki, Suita (JP)

(73) Assignee: Panasonic Corporation, Osaka (JP)

( * ) Notice: Subject to any disclaimer, the term of this patent is extended or adjusted under 35 U.S.C. 154(b) by 181 days.

(21) Appl. No.: 13/147,326

(22) PCT Filed: Feb. 3, 2010

(86) PCT No.: PCT/JP2010/051522
§ 371 (c)(1),
(2), (4) Date: Oct. 14, 2011

(87) PCT Pub. No.: WO2010/090225
PCT Pub. Date: Aug. 12, 2010

(65) Prior Publication Data
US 2012/0054835 A1    Mar. 1, 2012

(30) Foreign Application Priority Data

Feb. 3, 2009 (JP) .................................. 2009-023120

(51) Int. Cl.
| G06F 7/04 | (2006.01) |
| G06F 15/16 | (2006.01) |
| G06F 17/30 | (2006.01) |
| H04L 29/06 | (2006.01) |

(52) U.S. Cl.
USPC ............................................... 726/4; 726/27

(58) Field of Classification Search
USPC .............................................. 726/2–4, 27–30
See application file for complete search history.

(56) References Cited

U.S. PATENT DOCUMENTS

| 2003/0196118 | A1* | 10/2003 | Ushiki et al. ................... 713/201 |
| 2003/0233440 | A1* | 12/2003 | Nakamura et al. ............. 709/223 |
| 2004/0152464 | A1* | 8/2004 | Sugaya ....................... 455/435.1 |
| 2006/0150142 | A1 | 7/2006 | Yamamoto et al. |
| 2006/0233372 | A1* | 10/2006 | Shaheen et al. ................ 380/255 |
| 2012/0054835 | A1* | 3/2012 | Oda et al. ........................... 726/4 |

FOREIGN PATENT DOCUMENTS

| JP | 2003-069595 A | 3/2003 |
| JP | 2005-176345 A | 6/2005 |
| JP | 2007-102541 A | 4/2007 |

OTHER PUBLICATIONS

PCT/ISA/210 International Search Report for corresponding PCT/JP2010/051522 (dated May 18, 2010).

* cited by examiner

*Primary Examiner* — Eleni Shiferaw
*Assistant Examiner* — Jing Sims
(74) *Attorney, Agent, or Firm* — Renner, Otto, Boisselle & Sklar, LLP

(57) ABSTRACT

Upon obtaining second (first) class information corresponding to a second (first) device newly added to a network, the communication controller refers to fundamental request (notification) information and obtains request (notification) information corresponding to the obtained second (first) class information. The communication controller refers to notification (request) authorization information and obtains second (first) sender information associated with the notification (request) information indicative of the same processing as that indicated by the obtained request (notification) information. The communication controller creates request (notification) authorization information indicative of a combination of the first (second) sender information indicative of the second (first) device newly added to the network, the obtained request (notification) information, and first (second) destination information indicative of the same first (second) device as the first (second) device indicated by the obtained second (first) sender information.

8 Claims, 15 Drawing Sheets

FIG. 3

| terminal ID (OID) | authentication key | permission data | meta-data | account ID |
|---|---|---|---|---|
| USER1 | ***** | * / * / RWXP | MANAGER | USER1 |
| Device1 | ******** | USER1, Device2, Device3 / LIGHTING STATUS / ---P<br>USER1, Device2, Device3 / TERMINAL INFORMATION / RWXP | LIGHTING | USER1 |
| Device2 | ******** | USER1 / SWITCH / R--P<br>Device3 / SWITCH / ---P<br>USER1, Device1 / LIGHTING STATUS / R---<br>USER1, Device1, Device3 / TERMINAL INFORMATION / RWXP | SWITCH | USER1 |
| Device3 | ******** | USER1, Device2 / SWITCH / RWX-<br>USER1, Device1 / LIGHTING STATUS / RWX-<br>USER1, Device1, Device2 / TERMINAL INFORMATION / RWXP | VIEWER | USER1 |
| USER2 | ***** | * / * / RWXP | MANAGER | USER2 |
| Device11 | ******** | USER2, Device12 / LIGHTING STATUS / ---P<br>USER2, Device12, Device13 / TERMINAL INFORMATION / RWXP | LIGHTING | USER2 |
| Device12 | ******** | USER2 / SWITCH / R--P<br>USER2, Device11 / LIGHTING STATUS / R---<br>USER2, Device11 / TERMINAL INFORMATION / RWXP | SWITCH | USER2 |

FIG. 4

| terminal ID (OID) | authentication key | permission data | meta-data |
|---|---|---|---|
| USER1 | ***** | * / * / RWXP | MANAGER |
| Device1 | ******** | USER1, Device2, Device3 / LIGHTING STATUS / ---P<br>USER1, Device2, Device3 / TERMINAL INFORMATION / RWXP | LIGHTING |
| Device2 | ******** | USER1 / SWITCH / R--P<br>Device3 / SWITCH / ---P<br>USER1, Device1 / LIGHTING STATUS / R---<br>USER1, Device1, Device3 / TERMINAL INFORMATION / RWXP | SWITCH |
| Device3 | ******** | USER1, Device2 / SWITCH / RWX-<br>USER1, Device1 / LIGHTING STATUS / RWX-<br>USER1, Device1, Device2 / TERMINAL INFORMATION / RWXP | VIEWER |

FIG. 5

| terminal ID (OID) | authentication key | permission data | meta-data |
|---|---|---|---|
| USER2 | ***** | * / * / RWXP | MANAGER |
| Device11 | ******** | USER2, Device12 / LIGHTING STATUS / ---P<br>USER2, Device12, Device13 / TERMINAL INFORMATION / RWXP | LIGHTING |
| Device12 | ******** | USER2 / SWITCH / R--P<br>USER2, Device11 / LIGHTING STATUS / R---<br>USER2, Device11 / TERMINAL INFORMATION / RWXP | SWITCH |

FIG. 6

| class | node class | permission data (1) | permission data (2) | permission data (3) | permission data (4) | cooperation target | affiliation target |
|---|---|---|---|---|---|---|---|
| SWITCH SW112 | terminal | * / SWITCH / R–P | * / LIGHTING STATUS / R— | * / TERMINAL INFORMATION / RWXP | | service2 | |
| LIGHTING LGT321 | terminal | | * / LIGHTING STATUS / —-P | * / TERMINAL INFORMATION / RWXP | | service2 | |
| VIEWER 345 | terminal | * / SWITCH / RWX- | * / LIGHTING STATUS / RWX- | * / TERMINAL INFORMATION / RWXP | | | |
| THERMOMETER TM3 | terminal | | | | * / THERMOMETER / —-P | | O |
| child user | user | * / SWITCH / RWX- | * / LIGHTING STATUS / R-X- | * / TERMINAL INFORMATION / R— | | | |
| service1 | service | * / SWITCH / R-X- | | | | | |
| service2 | service | * / SWITCH / RWX- | * / LIGHTING STATUS / RWX- | | | | |
| service3 | service | | | | * / THERMOMETER / R— | | |

FIG. 7

| terminal ID (OID) | function ID (IID) | permission data | | Device4 | | | |
|---|---|---|---|---|---|---|---|
| | | | | LIGHTING STATUS | | TERMINAL INFORMATION | |
| | | RWX | P | RWX | P | RWX | P |
| USER1 | * | RWX | P | | ○ | | ○ |
| Device1 | LIGHTING STATUS | RWX | P | ○ | | | |
| | TERMINAL INFORMATION | RWX | P | | | ○ | |
| Device2 | SWITCH | RWX | P | | | | |
| | LIGHTING STATUS | RWX | P | | ○ | | |
| | TERMINAL INFORMATION | RWX | P | | | ○ | |
| Device3 | SWITCH | RWX | P | | | | |
| | LIGHTING STATUS | RWX | P | | ○ | | ○ |
| | TERMINAL INFORMATION | RWX | P | | | ○ | ○ |
| terminal ID added to permission data | | USER1,Device2, Device3 | | USER1,Device1, Device2,Device3 | | | |

FIG. 8

| terminal ID (OID) | authentication key | permission data | meta-data | account ID |
|---|---|---|---|---|
| Device4 | ****** | USER1, Device2, Device3 / LIGHTING STATUS / ---P<br>USER1, Device1, Device2, Device3 / TERMINAL INFORMATION / RWXP | LIGHTING | USER1 |

FIG. 9

| terminal ID (OID) | authentication key | permission data | meta-data | account ID |
|---|---|---|---|---|
| USER1 | ***** | * / * / RWXP | MANAGER | USER1 |
| Device1 | ******* | USER1, Device2, Device3 / LIGHTING STATUS / ---P<br>USER1, Device1, Device2, Device3, Device4 / TERMINAL INFORMATION / RWXP | LIGHTING | USER1 |
| Device2 | ******* | USER1 / SWITCH / R--P<br>Device3 / SWITCH / ---P<br>USER1, Device1, Device3, Device4 / LIGHTING STATUS / R---<br>USER1, Device1, Device2, Device3, Device4 / TERMINAL INFORMATION / RWXP | SWITCH | USER1 |
| Device3 | ****** | USER1, Device2 / SWITCH / RWX-<br>USER1, Device1, Device2, Device4 / LIGHTING STATUS / RWX-<br>USER1, Device1, Device2, Device3, Device4 / TERMINAL INFORMATION / RWXP | VIEWER | USER1 |

FIG. 10

| terminal ID (OID) | authentication key | permission data | meta-data | account ID |
|---|---|---|---|---|
| USER1 | ***** | * / * / RWXP | MANAGER | USER1 |
| Device1 | ******** | USER1, Device2, Device3 / LIGHTING STATUS / ---P<br>USER1, Device2, Device3, Device4 / TERMINAL INFORMATION / RWXP | LIGHTING | USER1 |
| Device2 | ******** | USER1 / SWITCH / R--P<br>Device3 / SWITCH / ---P<br>USER1, Device1, Device4 / LIGHTING STATUS / R---<br>USER1, Device1, Device3, Device4 / TERMINAL INFORMATION / RWXP | SWITCH | USER1 |
| Device3 | ******** | USER1, Device2 / SWITCH / RWX-<br>USER1, Device1, Device4 / LIGHTING STATUS / RWX-<br>USER1, Device1, Device2, Device4 / TERMINAL INFORMATION / RWXP | VIEWER | USER1 |
| USER2 | ***** | * / * / RWXP | MANAGER | USER2 |
| Device11 | ******** | USER2, Device12 / LIGHTING STATUS / ---P<br>USER2, Device12, Device13 / TERMINAL INFORMATION / RWXP | LIGHTING | USER2 |
| Device12 | ******** | USER2 / SWITCH / R--P<br>USER2, Device11 / LIGHTING STATUS / R---<br>USER2, Device11 / TERMINAL INFORMATION / RWXP | SWITCH | USER2 |
| Device4 | ******** | USER1, Device2, Device3 / LIGHTING STATUS / ---P<br>USER1, Device1, Device2, Device3 / TERMINAL INFORMATION / RWXP | LIGHTING | USER1 |

FIG. 11

| terminal ID (OID) | authentication key | permission data | meta-data |
|---|---|---|---|
| USER1 | ***** | * / * / RWXP | MANAGER |
| Device1 | ******** | USER1, Device2, Device3 / LIGHTING STATUS / ---P<br>USER1, Device2, Device3, Device4 / TERMINAL INFORMATION / RWXP | LIGHTING |
| Device2 | ******** | USER1 / SWITCH / R--P<br>Device3 / SWITCH / ---P<br>USER1, Device1, Device4 / LIGHTING STATUS / R---<br>USER1, Device1, Device3, Device4 / TERMINAL INFORMATION / RWXP | SWITCH |
| Device3 | ******** | USER1, Device2 / SWITCH / RWX-<br>USER1, Device1, Device4 / LIGHTING STATUS / RWX-<br>USER1, Device1, Device2, Device4 / TERMINAL INFORMATION / RWXP | VIEWER |
| Device4 | ******** | USER1, Device2, Device3 / LIGHTING STATUS / ---P<br>USER1, Device1, Device2, Device3 / TERMINAL INFORMATION / RWXP | LIGHTING |

FIG. 12

| terminal ID (OID) | authentication key | permission data | meta-data | account ID |
|---|---|---|---|---|
| USER1 | **** | * / * / RWXP | MANAGER | USER1 |
| Device1 | ******* | USER1, Device2, Device3, USER1Child / LIGHTING STATUS / ---P<br>USER1, Device2, Device3, USER1Child / TERMINAL INFORMATION / RWXP | LIGHTING | USER1 |
| Device2 | ******* | USER1 / SWITCH / R--P<br>Device3, USER1Child / SWITCH / ---P<br>USER1, Device1 / LIGHTING STATUS / R---<br>USER1, Device1, Device3, USER1Child / TERMINAL INFORMATION / RWXP | SWITCH | USER1 |
| Device3 | ******* | USER1, Device2 / SWITCH / RWX-<br>USER1, Device1 / LIGHTING STATUS / RWX-<br>USER1, Device1, Device2, USER1Child / TERMINAL INFORMATION / RWXP | VIEWER | USER1 |
| USER2 | **** | * / * / RWXP | MANAGER | USER2 |
| Device11 | ******* | USER2, Device12 / LIGHTING STATUS / ---P<br>USER2, Device12, Device13 / TERMINAL INFORMATION / RWXP | LIGHTING | USER2 |
| Device12 | ******* | USER2 / SWITCH / R--P<br>USER2, Device11 / LIGHTING STATUS / R---<br>USER2, Device11 / TERMINAL INFORMATION / RWXP | SWITCH | USER2 |
| USER1Child | ******* | Device2 / SWITCH / RWX-<br>Device1 / LIGHTING STATUS / R-X-<br>Device1, Device2, Device3 / TERMINAL INFORMATION / R--- | CHILD USER | USER1 |

FIG. 13

| terminal ID (OID) | authentication key | permission data | meta-data | account ID |
|---|---|---|---|---|
| USER1 | ***** | * / * / RWXP | MANAGER | USER1 |
| Device1 | ******** | USER1, Device2, Device3 / LIGHTING STATUS / ---P<br>USER1, Device2, Device3 / TERMINAL INFORMATION / RWXP | LIGHTING | USER1 |
| Device2 | ******** | USER1 / SWITCH / R--P<br>Device3, USER1@Service1 / SWITCH / ---P<br>USER1, Device1 / LIGHTING STATUS / R--<br>USER1, Device1, Device3 / TERMINAL INFORMATION / RWXP | SWITCH | USER1 |
| Device3 | ******** | USER1, Device2 / SWITCH / RWX-<br>USER1, Device1 / LIGHTING STATUS / RWX-<br>USER1, Device1, Device2 / TERMINAL INFORMATION / RWXP | VIEWER | USER1 |
| USER2 | ***** | * / * / RWXP | MANAGER | USER2 |
| Device11 | ******** | USER2, Device12 / LIGHTING STATUS / ---P<br>USER2, Device12, Device13 / TERMINAL INFORMATION / RWXP | LIGHTING | USER2 |
| Device12 | ******** | USER2 / SWITCH / R--P<br>USER2, Device11 / LIGHTING STATUS / R--<br>USER2, Device11 / TERMINAL INFORMATION / RWXP | SWITCH | USER2 |
| USER1@Service1 | | USER1, Device2 / SWITCH / R-X- | SERVICE | USER1 |

FIG. 14

| terminal ID (OID) | authentication key | permission data | meta-data | account ID |
|---|---|---|---|---|
| USER1 | ***** | * / * / RWXP | MANAGER | USER1 |
| Device1 | ******** | USER1, Device2, Device3, USER2@Service2 / LIGHTING STATUS / ---P | LIGHTING | USER1 |
| | | USER1, Device2, Device3 / TERMINAL INFORMATION / RWXP | | |
| Device2 | ******** | USER1 / SWITCH / R--P | SWITCH | USER1 |
| | | Device3, USER2@Service2 / SWITCH / ---P | | |
| | | USER1, Device1 / LIGHTING STATUS / R--- | | |
| | | USER1, Device1, Device3 / TERMINAL INFORMATION / RWXP | | |
| Device3 | ******** | USER1, Device2 / SWITCH / RWX- | VIEWER | USER1 |
| | | USER1, Device1 / LIGHTING STATUS / RWX- | | |
| | | USER1, Device1, Device2 / TERMINAL INFORMATION / RWXP | | |
| USER2 | ***** | * / * / RWXP | MANAGER | USER2 |
| Device11 | ******** | USER2, Device12, USER1@Service2 / LIGHTING STATUS / ---P | LIGHTING | USER2 |
| | | USER2, Device12, Device13 / TERMINAL INFORMATION / RWXP | | |
| Device12 | ******** | USER2 / SWITCH / R--P | SWITCH | USER2 |
| | | USER1@Service2 / SWITCH / ---P | | |
| | | USER2, Device11 / LIGHTING STATUS / R--- | | |
| | | USER2, Device11 / TERMINAL INFORMATION / RWXP | | |
| USER1@Service2 | | Device11 / LIGHTING STATUS / RWX- | SERVICE | USER2 |
| | | Device12 / SWITCH / RWX- | | |
| USER2@Service2 | | Device1 / LIGHTING STATUS / RWX- | SERVICE | USER1 |
| | | Device2 / SWITCH / RWX- | | |

FIG. 15

| terminal ID (OID) | authentication key | permission data | meta-data |
|---|---|---|---|
| USER1 | ***** | * / * / RWXP | MANAGER |
| Device1 | ******** | USER1, Device2, Device3, USER2@Service2 / LIGHTING STATUS / ---P<br>USER1, Device2, Device3 / TERMINAL INFORMATION / RWXP | LIGHTING |
| Device2 | ******** | USER1 / SWITCH / R--P<br>Device3, USER2@Service2 / SWITCH / ---P<br>USER1, Device1 / LIGHTING STATUS / R---<br>USER1, Device1, Device3 / TERMINAL INFORMATION / RWXP | SWITCH |
| Device3 | ******** | USER1, Device2 / SWITCH / RWX-<br>USER1, Device1 / LIGHTING STATUS / RWX-<br>USER1, Device1, Device2 / TERMINAL INFORMATION / RWXP | VIEWER |
| USER2@Service2 | | Device1 / LIGHTING STATUS / RWX-<br>Device2 / SWITCH / RWX- | SERVICE |

FIG. 16

| terminal ID (OID) | authentication key | permission data | meta-data |
|---|---|---|---|
| USER2 | ***** | * / * / RWXP | MANAGER |
| Device11 | ******* | USER2, Device12, USER1@Service2 / LIGHTING STATUS / ---P<br>USER2, Device12, Device13 / TERMINAL INFORMATION / RWXP | LIGHTING |
| Device12 | ******* | USER2 / SWITCH / R--P<br>USER1@Service2 / SWITCH / ---P<br>USER2, Device11 / LIGHTING STATUS / R---<br>USER2, Device11 / TERMINAL INFORMATION / RWXP | SWITCH |
| USER1@Service2 | | Device11 / LIGHTING STATUS / RWX-<br>Device12 / SWITCH / RWX- | SERVICE |

FIG. 17

| terminal ID (OID) | authentication key | permission data | meta-data | account ID |
|---|---|---|---|---|
| USER1 | ***** | * / * / RWXP | MANAGER | USER1 |
| Device1 | ******* | USER1, Device2, Device3 / LIGHTING STATUS / ---P<br>USER1, Device2, Device3 / TERMINAL INFORMATION / RWXP | LIGHTING | USER1 |
| Device2 | ******* | USER1 / SWITCH / R--P<br>Device3 / SWITCH / ---P<br>USER1, Device1 / LIGHTING STATUS / R---<br>USER1, Device1, Device3 / TERMINAL INFORMATION / RWXP | SWITCH | USER1 |
| Device3 | ******* | USER1, Device2 / SWITCH / RWX-<br>USER1, Device1 / LIGHTING STATUS / RWX-<br>USER1, Device1, Device2 / TERMINAL INFORMATION / RWXP | VIEWER | USER1 |
| USER2 | ***** | * / * / RWXP | MANAGER | USER2 |
| Device11 | ******* | USER2, Device12 / LIGHTING STATUS / ---P<br>USER2, Device12, Device13 / TERMINAL INFORMATION / RWXP | LIGHTING | USER2 |
| Device12 | ******* | USER2 / SWITCH / R--P<br>USER2, Device11 / LIGHTING STATUS / R---<br>USER2, Device11 / TERMINAL INFORMATION / RWXP | SWITCH | USER2 |
| Device4 | ******* | USER1, Vender@Service3 / THERMOMETER / ---P | THERMOMETER | USER1 |
| Vender@Service3 | | Device4 / THERMOMETER / R--- | SERVICE | USER1 |
| Vender | ***** | * / * / RWXP | AFFILIATION SERVICE MANAGER | Vender |

COMMUNICATION CONTROLLER AND NETWORK SYSTEM UTILIZING THE SAME

TECHNICAL FIELD

The present invention is directed to communication controllers as well as network systems using the same, and particularly to a communication controller configured to create authorization information of a device on a network as well as a network system using the same.

BACKGROUND ART

Document 1 (JP 2003-69595 A) discloses an access control system. The access control system disclosed in Document 1 includes a home server connected to home devices via a home network. The home server includes an access control table, a user table, and a device table. Upon receiving a request of access from an external device to the home device, the homes server judges whether or not the requested access is permitted on the basis of the access control table, the user table, and the device table.

The access control system disclosed in Document 1 needs many pieces of information (authorization information) determining parameters for judging whether or not the access is permitted. Therefore, it is difficult and cumbersome for a user to create the authorization information with respect to a device which is newly added to the network.

DISCLOSURE OF INVENTION

In view of the above insufficiency, the present invention has been aimed to propose a communication controller and a network system using the same which are capable of automatically creating authorization information for a device newly added to a network.

The communication controller in accordance with the present invention is used in a network system including: a first device configured to perform predetermined processing and a second device configured to request the first device to perform the predetermined processing. The second device includes a request unit configured to send a request signal. The request signal includes first sender information indicative of the second device as a sender of the request signal, request information indicative of processing which the second device requests the first device to perform, and first destination information indicative of the first device as a destination of the request signal. The first device includes: a function unit configured to, upon receiving the request signal, perform the processing indicated by the request information included in the request signal, and a notification unit configured to send a notification signal. The notification signal includes second sender information indicative of the first device as a sender of the notification signal, notification information indicative of processing available in the function unit, and second destination information indicative of the second device as a destination of the notification signal.

The communication controller according to the present invention comprises an authorization information storage unit, a relay unit configured to relay between the first device and the second device via a network, a fundamental information storage unit, a request authorization information adding unit, and a notification authorization information adding unit. The authorization information storage unit is configured to store first authorization information indicative of a combination of the first sender information, the request information, and the first destination information, and second authorization information indicative of a combination of the second sender information, the notification information, and the second destination information. The relay unit includes a request signal relay module and a notification signal relay module. The request signal relay module is configured to, upon receiving the request signal, check whether or not the request authorization information includes the same combination of the first sender information, the request information, and the first destination information as that indicated by the received request signal, and relay the received request signal upon acknowledging that the request authorization information includes the same combination of the first sender information, the request information, and the first destination information as that indicated by the received request signal. The notification signal relay module is configured to, upon receiving the notification signal, check whether or not the notification authorization information includes the same combination of the second sender information, the notification information, and the second destination information as that indicated by the received notification signal, and relay the received notification signal upon acknowledging that the notification authorization information includes the same combination of the second sender information, the notification information, and the second destination information as that indicated by the received notification signal. The fundamental information storage unit is configured to store fundamental notification information indicative of a correspondence relation between the notification information and first class information indicative of a class of the first device, and fundamental request information indicative of a correspondence relation between the request information and second class information indicative of a class of the second device. The request authorization information adding unit comprises: a second class information obtaining module configured to obtain the second class information of the second device which is newly added to the network; a request information obtaining module configured to refer to the fundamental request information stored in the fundamental information storage unit, and obtain the request information corresponding to the second class information obtained by the second class information obtaining module; a second sender information obtaining module configured to refer to the notification authorization information stored in the authorization information storage unit, and obtain the second sender information which is associated with the notification information indicative of the same processing as that indicated by the request information obtained by the request information obtaining module; a request authorization information creation module configured to create the request authorization information which indicates a combination of the first sender information indicative of the second device newly added to the network, the request information obtained by the request information obtaining module, and the first destination information indicative of the same first device as that indicated by the second sender information obtained by the second sender information obtaining module; and a request authorization information storing module configured to store the request authorization information created by the request authorization information creation module in the authorization information storage unit. The notification authorization information adding unit comprises: a first class information obtaining module configured to obtain the first class information of the first device which is newly added to the network; a notification information obtaining module configured to refer to the fundamental notification information stored in the fundamental information storage unit, and obtain the notification information corresponding to the first class information obtained by the first class information obtaining module; a first sender information obtaining module configured to refer to the request authorization information stored in the authorization information storage unit, and obtain the first sender information which is associated with the request information indicative of the same processing as that indicated by the notification information obtained by the notification information obtaining module; a notification authorization information creation module configured to create the notification authorization information which indicates a combination of the second sender information indicative of the first device newly added to the network, the notification information obtained by the notification information obtaining module, and the second destination information indicative of the same second device as that indicated by the first sender information obtained by the first sender information obtaining module; and a notification authorization information storing module configured to store the notification authorization information created by the notification authorization information creation module in the authorization information storage unit.

In a preferred aspect, the communication controller further comprises: a request authorization information updating unit; and a notification authorization information updating unit. The request authorization information updating unit comprises a notification authorization information checking module, a second notification authorization information creation module, and a second notification authorization information storing module. The notification authorization information checking module is configured to check whether or not the authorization information storage unit stores the notification authorization information including a first combination. The first combination is defined as a combination of the second sender information indicative of the same first device as that indicated by the first destination information of the request authorization information created by the request authorization information creation module, and the notification information indicative of the same processing as that indicated by the request information of the request authorization information created by the request authorization information creation module. The second notification authorization information creation module is configured to create the notification authorization information indicative of a combination of the first combination and the second destination information indicative of the same second device as that indicated by the first sender information of the request authorization information created by the request authorization information creation module, upon acknowledging that the authorization information storage unit stores the notification authorization information including the first combination. The second notification authorization information storing module is configured to store the notification authorization information created by the second notification authorization information creation module in the authorization information storage unit. The notification authorization information updating unit comprises a request authorization information checking module, a second request authorization information creation module, and a second request authorization information storing module. The request authorization information checking module is configured to check whether or not the authorization information storage unit stores the request authorization information including a second combination. The second combination is defined as a combination of the first sender information indicative of the same second device as that indicated by the second destination information of the notification authorization information created by the notification authorization information creation module, and the request information indicative of the same processing as that indicated by the notification information of the notification authorization information created by the notification authorization information creation module. The second request authorization information creation module is configured to create the request authorization information indicative of a combination of the second combination and the first destination information indicative of the same first device as that indicated by the second sender information of the notification authorization information created by the notification authorization information creation module, upon acknowledging that the authorization information storage unit stores the request authorization information including the second combination. The second request authorization information storing module is configured to store the request authorization information created by the second request authorization information creation module in the authorization information storage unit.

In a preferred aspect, the second device includes the class of a user. The request unit of the second device having the class indicative of the user is configured to send the request signal including the first sender information indicative of identification information of the user. The request authorization information creation module is configured to select the identification information of the user as the first sender information of the request authorization information when the class of the second device is the user. The user includes a normal user and a special user. The second class information regarding the special user is correlated to the second class information regarding the normal user with respect to a part of the fundamental request information.

In a preferred aspect, the second device includes the class of a service. The request unit of the second device having the class indicative of the service is configured to send the request signal including the first sender information defined by identification information of the service. The second class information obtaining module is configured to, in response to a request of adding the service, obtain the second class information corresponding to the requested service. The request authorization information creation module is configured to select information defined by identification information of the service as the first sender information of the request authorization information when the class of the second device is the service.

In a preferred aspect, the second device includes the class of a cooperation service configured to for perform cooperation between the first and second devices respectively placed in different residences. The request unit of the second device having the class indicative of the cooperation service is configured to send the request signal including the first sender information defined by identification information of the cooperation service. The fundamental request information is defined to indicate a correspondence (cooperation) relation between the second class information and cooperation target (object) information which indicates whether or not the cooperation service is available. The second class information obtaining module is configured to, in response to a request of implementing the cooperation service, obtain the second class information corresponding to the requested cooperation service. The request authorization information creation module is configured to, upon acknowledging that the class of the second device is the cooperation service, refer to the fundamental request information stored in the fundamental information storage unit, and select the first device corresponding to the first class information available for the cooperation service from the first devices indicated by the second sender information obtained by the second sender information obtaining module. The request authorization information creation module is configured to create the request authorization information indicative of a combination of the first sender information defined by identification information of the cooperation service, the request information obtained by the request information obtaining module, and the first destination information indicative of the first device selected by the request authorization information creation module.

In a preferred aspect, the second device includes the class of an affiliation service which is configured to be interacted between said first or second device and a center server of one of other service providers. The request unit of the second device having the class indicative of the affiliation service is configured to send the request signal including the first sender information defined by identification information of the affiliation service. The fundamental request information indicates a correspondence relation between the second class information and affiliation object information which indicates whether or not the affiliation service is available. The second class information obtaining module is configured to, in response to a request of implementing the affiliation service, obtain the second class information corresponding to the requested affiliation service. The request authorization information creation module being configured to, upon acknowledging that the class of the second device is the affiliation service, refer to the fundamental request information stored in the fundamental information storage unit, and select the first device corresponding to the first class information available for the affiliation service from the first devices indicated by the second sender information obtained by the second sender information obtaining module. The request authorization information creation module is configured to create the request authorization information indicative of a combination of the first sender information defined by identification information of the affiliation service, the request information obtained by the request information obtaining module, and the first destination information indicative of the first device selected by the request authorization information creation module.

In a preferred aspect, the network system includes a center server configured to manage the first device and the second device, and a gateway configured to relay communication between the center server and the first device as well as the second device. The center server is provided with the fundamental information storage unit. The gateway is provided with the authorization information storage unit, the request authorization information adding unit, and the notification authorization information adding unit.

The network system in accordance with the present invention comprises: a first device configured to perform predetermined processing; a second device configured to request the first device to perform the predetermined processing; and a communication controller configured to control communication between the first device and the second device. The second device includes a request unit configured to send a request signal. The request signal includes first sender information indicative of the second device selected as a sender of the request signal, request information indicative of processing which the second device requests the first device to perform, and first destination information indicative of the first device selected as a destination of the request signal. The first device includes: a function unit configured to, upon receiving the request signal, perform the processing indicated by the request information included in the request signal, and a notification unit configured to send a notification signal. The notification signal includes second sender information indicative of the first device selected as a sender of the notification signal, notification information indicative of processing available in the function unit, and second destination information indicative of the second device selected as a destination of the notification signal. The communication controller comprises an authorization information storage unit, a relay unit configured to relay between the first device and the second device via a network, a fundamental information storage unit, a request authorization information adding unit, and a notification authorization information adding unit. The authorization information storage unit is configured to store first authorization information indicative of a combination of the first sender information, the request information, and the first destination information, and second authorization information indicative of a combination of the second sender information, the notification information, and the second destination information. The relay unit includes a request signal relay module and a notification signal relay module. The request signal relay module is configured to, upon receiving the request signal, check whether or not the request authorization information includes the same combination of the first sender information, the request information, and the first destination information as that indicated by the received request signal, and relay the received request signal upon acknowledging that the request authorization information includes the same combination of the first sender information, the request information, and the first destination information as that indicated by the received request signal. The notification signal relay module is configured to, upon receiving the notification signal, check whether or not the notification authorization information includes the same combination of the second sender information, the notification information, and the second destination information as that indicated by the received notification signal, and relay the received notification signal upon acknowledging that the notification authorization information includes the same combination of the second sender information, the notification information, and the second destination information as that indicated by the received notification signal. The fundamental information storage unit is configured to store fundamental notification information indicative of a correspondence relation between the notification information and first class information indicative of a class of the first device, and fundamental request information indicative of a correspondence relation between the request information and second class information indicative of a class of the second device. The request authorization information adding unit comprises: a second class information obtaining module configured to obtain the second class information of the second device which is newly added to the network; a request information obtaining module configured to refer to the fundamental request information stored in the fundamental information storage unit, and obtain the request information corresponding to the second class information obtained by the second class information obtaining module; a second sender information obtaining module configured to refer to the notification authorization information stored in the authorization information storage unit, and obtain the second sender information which is associated with the notification information indicative of the same processing as that indicated by the request information obtained by the request information obtaining module; a request authorization information creation module configured to create the request authorization information which indicates the combination of the first sender information indicative of the second device newly added to the network, the request information obtained by the request information obtaining module, and the first destination information indicative of the same first device as that indicated by the second sender information obtained by the second sender information obtaining module; and a request authorization information storing module configured to store the request authorization information created by the request authorization information creation module in the authorization information storage unit. The notification authorization information adding unit comprises: a first class information obtaining module configured to obtain the first class information of the first device which is newly added to the network; a notification information obtaining module configured to refer to the fundamental notification information stored in the fundamental information storage unit, and obtain the notification information corresponding to the first class information obtained by the first class information obtaining module; a first sender information obtaining module configured to refer to the request authorization information stored in the authorization information storage unit, and obtain the first sender information which is associated with the request information indicative of the same processing as that indicated by the notification information obtained by the notification information obtaining module; a notification authorization information creation module configured to create the notification authorization information which indicates the combination of the second sender information indicative of the first device newly added to the network, the notification information obtained by the notification information obtaining module, and the second destination information indicative of the same second device as that indicated by the first sender information obtained by the first sender information obtaining module; and a notification authorization information storing module configured to store the notification authorization information created by the notification authorization information creation module in the authorization information storage unit.

BRIEF DESCRIPTION OF DRAWINGS

FIG. 3 is an explanatory diagram illustrating authorization information, FIG. 4 is an explanatory diagram illustrating the authorization information, FIG. 5 is an explanatory diagram illustrating the authorization information, FIG. 6 is an explanatory diagram illustrating fundamental information, FIG. 7 is an explanatory diagram illustrating process of creating the authorization information, FIG. 8 is an explanatory diagram illustrating the authorization information, FIG. 9 is an explanatory diagram illustrating the authorization information, FIG. 10 is an explanatory diagram illustrating the authorization information, FIG. 11 is an explanatory diagram illustrating the authorization information, FIG. 12 is an explanatory diagram illustrating the authorization information, FIG. 13 is an explanatory diagram illustrating the authorization information, FIG. 14 is an explanatory diagram illustrating the authorization information, FIG. 15 is an explanatory diagram illustrating the authorization information, FIG. 16 is an explanatory diagram illustrating the authorization information, and FIG. 17 is an explanatory diagram illustrating the authorization information.

BEST MODE FOR CARRYING OUT THE INVENTION

Figure 1:
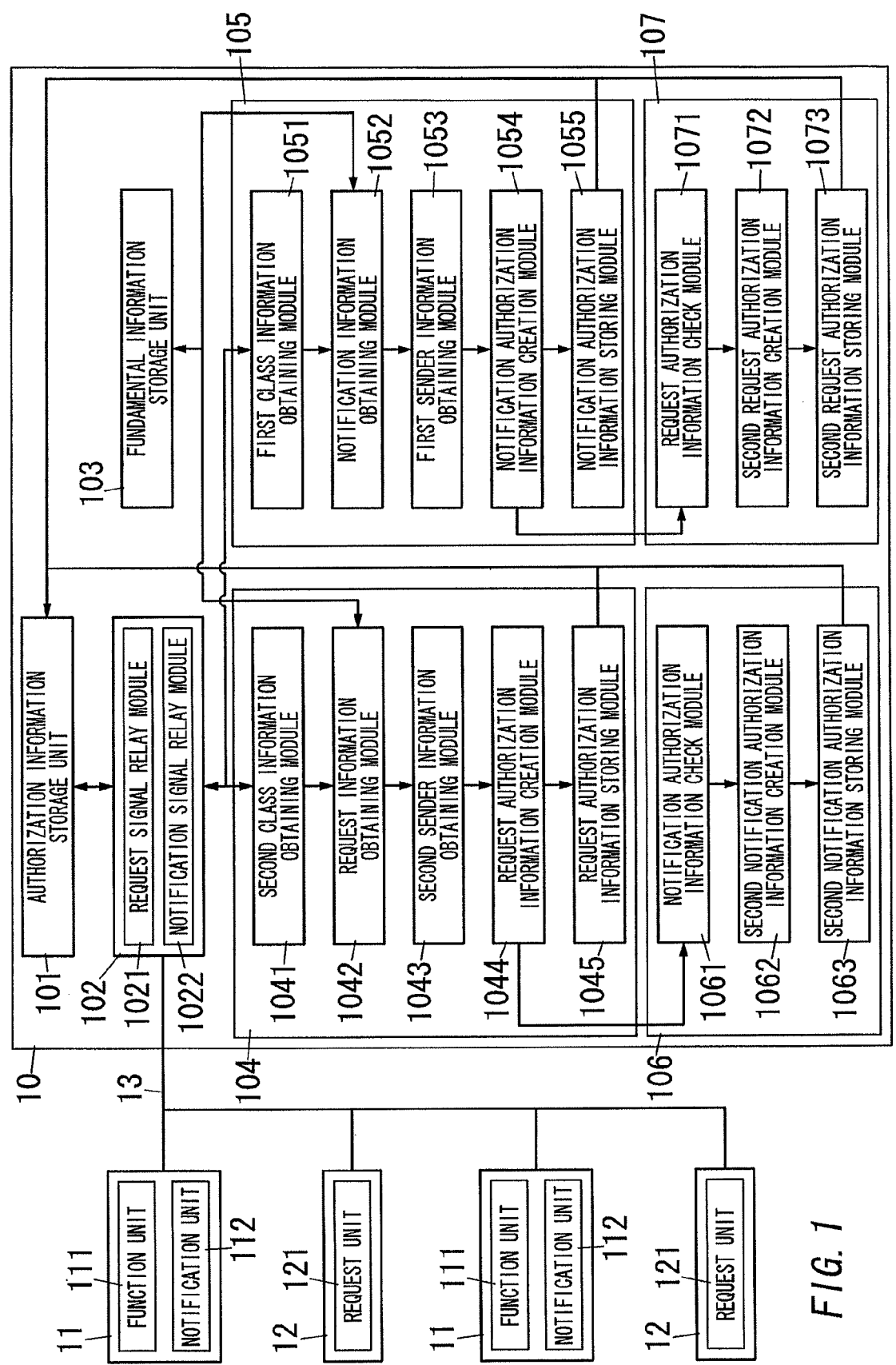
FIG. 1 is a block diagram illustrating a configuration of a network system employing a communication controller in accordance with one embodiment of the present invention.

FIG. 1 shows a configuration of a network system employing a communication controller (access controller) 10 of one embodiment of the present invention.

The network system includes a first device (provider device) 11 configured to perform predetermined processing, and a second device (requestor device) 12 configured to request the first device 11 to perform the predetermined processing.

The second device 12 includes a request unit 121 configured to send a request signal. The request signal includes first sender information indicative of the second device 12 which is a sender of the request signal, request information indicative of processing which the second device 12 requests the first device 11 to perform, and first destination information indicative of the first device 11 designated as a destination of the request signal.

The first device 11 includes a function unit 111 configured to, upon receiving the request signal, perform the processing indicated by the request information included in the request signal. The function unit 111 has an object associated with at least one of predetermined functions. The function associated with the object having a function ID (IID).

The first device 11 further includes a notification unit 112 configured to send a notification signal. The notification signal includes second sender information indicative of the first device 11 which is a sender of the notification signal, notification information indicative of processing available in the function unit 111, and second destination information indicative of the second device 12 designated as a destination of the notification signal.

The communication controller 10 includes an authorization information storage unit 101, a relay unit 102 configured to relay between the first device 11 and the second device 12 via a network 13, a fundamental information storage unit 103, a request authorization information adding unit 104, a notification authorization information adding unit 105, a notification authorization information updating unit 106, and a request authorization information updating unit 107.

The authorization information storage unit 101 is configured to store first authorization information indicative of a combination of the first sender information, the request information, and the first destination information. Further, the authorization information storage unit 101 is configured to store second authorization information indicative of a combination of the second sender information, the notification information, and the second destination information.

The relay unit 102 includes a request signal relay module 1021 and a notification signal relay module 1022.

The request signal relay module 1021 is configured to, upon receiving the request signal, check whether or not the request authorization information includes the same combination of the first sender information, the request information, and the first destination information as that indicated by the received request signal. The request signal relay module 1021 is configured to relay the received request signal upon acknowledging that the request authorization information includes the same combination of the first sender information, the request information, and the first destination information as that indicated by the received request signal.

The notification signal relay module 1022 is configured to, upon receiving the notification signal, check whether or not the notification authorization information includes the same combination of the second sender information, the notification information, and the second destination information as that indicated by the received notification signal. The notification signal relay module 1022 is configured to relay the received notification signal upon acknowledging that the notification authorization information includes the same combination of the second sender information, the notification information, and the second destination information as that indicated by the received notification signal.

The fundamental information storage unit 103 is configured to store fundamental notification information and fundamental request information. The fundamental notification information indicates a correspondence relation between the notification information and first class information. The first class information indicates a class of the first device 11. The fundamental request information indicates a correspondence relation between the request information and second class information. The second class information indicates a class of the second device 12.

The request authorization information adding unit 104 includes a second class information obtaining module 1041, a request information obtaining module 1042, a second sender information obtaining module 1043, a request authorization information creation module 1044, and a request authorization information storing module 1045.

The second class information obtaining module 1041 is configured to obtain the second class information of the second device 12 which is newly added to the network 13. The second class information obtaining module 1041 is configured to, in response to a request of adding a service, obtain the second class information corresponding to the requested service. The second class information obtaining module 1041 is configured to, in response to a request of implementing a cooperation service, obtain the second class information corresponding to the requested cooperation service. The second class information obtaining module 1041 is configured to, in response to a request of implementing an affiliation service, obtain the second class information corresponding to the requested affiliation service.

The request information obtaining module 1042 is configured to refer to the fundamental request information stored in the fundamental information storage unit 103, and obtain the request information corresponding to the second class information obtained by the second class information obtaining module 1041.

The second sender information obtaining module 1043 is configured to refer to the notification authorization information stored in the authorization information storage unit 101, and obtain the second sender information which is associated with the notification information indicative of the same processing as that indicated by the request information obtained by the request information obtaining module 1042.

The request authorization information creation module 1044 is configured to create new request authorization information. The new request authorization information indicates a combination of the first sender information indicative of the second device 12 newly added to the network 13, the request information obtained by the request information obtaining module, and the first destination information indicative of the same first device 11 as that indicated by the second sender information obtained by the second sender information obtaining module.

The request authorization information creation module 1044 is configured to, when the second device 12 has the class of a user, select identification information of the user as the first sender information of the request authorization information. The request authorization information creation module 1044 is configured to select information defined by identification information of the service as the first sender information of the request authorization information when the second device 12 has the class of the service.

The request authorization information creation module 1044 is configured to, upon acknowledging that the second device 12 has the class of the cooperation service, refer to the fundamental request information stored in the fundamental information storage unit 103, and select the first device 11 corresponding to the first class information available for the cooperation service from the first devices 11 indicated by the second sender information obtained by the second sender information obtaining module 1043. The request authorization information creation module 1044 is configured to create the request authorization information indicative of a combination of the first sender information defined by identification information of the cooperation service, the request information obtained by the request information obtaining module 1042, and the first destination information indicative of the first device 11 selected by the request authorization information creation module 1044.

The request authorization information creation module 1044 is configured to, upon acknowledging that the second device 12 has the class of the affiliation service, refer to the fundamental request information stored in the fundamental information storage unit 103, and select the first device 11 corresponding to the first class information available for the affiliation service from the first devices indicated by the second sender information obtained by the second sender information obtaining module 1043. The request authorization information creation module 1044 is configured to create the request authorization information indicative of a combination of the first sender information defined by identification information of the affiliation service, the request information obtained by the request information obtaining module 1042, and the first destination information indicative of the first device 11 selected by the request authorization information creation module 1044.

The request authorization information storing module 1045 is configured to store the request authorization information created by the request authorization information creation module 1044 in the authorization information storage unit 101.

The notification authorization information adding unit 105 includes a first class information obtaining module 1051, a notification information obtaining module 1052, a first sender information obtaining module 1053, a notification authorization information creation module 1054, and a notification authorization information storing module 1055.

The first class information obtaining module 1051 is configured to obtain the first class information of the first device 11 which is newly added to the network 13.

The first class information obtaining module 1051 is configured to, in response to the request of adding the service, obtain the first class information corresponding to the requested service. The first class information obtaining module 1051 is configured to, in response to the request of implementing the cooperation service, obtain the first class information corresponding to the requested cooperation service. The first class information obtaining module 1051 is configured to, in response to the request of implementing the affiliation service, obtain the first class information corresponding to the requested affiliation service.

The notification information obtaining module 1052 is configured to refer to the fundamental notification information stored in the fundamental information storage unit 103, and obtain the notification information corresponding to the first class information obtained by the first class information obtaining module 1051.

The first sender information obtaining module 1053 is configured to refer to the request authorization information stored in the authorization information storage unit 101, and obtain the first sender information which is associated with the request information indicative of the same processing as that indicated by the notification information obtained by the notification information obtaining module 1052.

The notification authorization information creation module 1054 is configured to create new notification authorization information. The new notification authorization information indicates a combination of the second sender information indicative of the first device 11 newly added to the network 13, the notification information obtained by the notification information obtaining module, and the second destination information indicative of the same second device 12 as that indicated by the first sender information obtained by the first sender information obtaining module.

The notification authorization information creation module 1054 is configured to, when the first device 11 has the class of the user, select the identification information of the user as the second sender information of the notification authorization information. The notification authorization information creation module 1054 is configured to select the information defined by the identification information of the service as the second sender information of the notification authorization information when the first device 11 has the class of the service.

The notification authorization information creation module 1054 is configured to, upon acknowledging that the first device 11 has the class of the cooperation service, refer to the fundamental notification information stored in the fundamental information storage unit 103, and select the second device 12 corresponding to the second class information available for the cooperation service from the second devices 12 indicated by the first sender information obtained by the first sender information obtaining module 1053. The notification authorization information creation module 1054 is configured to create the notification authorization information indicative of a combination of the second sender information defined by the identification information of the cooperation service, the notification information obtained by the notification information obtaining module 1052, and the second destination information indicative of the second device 12 selected by the notification authorization information creation module 1054.

The notification authorization information creation module 1054 is configured to, upon acknowledging that the first device 11 has the class of the affiliation service, refer to the fundamental notification information stored in the fundamental information storage unit 103, and select the second device 12 corresponding to the second class information available for the affiliation service from the second devices 12 indicated by the first sender information obtained by the first sender information obtaining module 1053. The notification authorization information creation module 1054 is configured to create the notification authorization information indicative of a combination of the second sender information defined by the identification information of the affiliation service, the notification information obtained by the notification information obtaining module 1052, and the second destination information indicative of the second device 12 selected by the notification authorization information creation module 1054.

The notification authorization information storing module 1055 is configured to store the notification authorization information created by the notification authorization information creation module 1054 in the authorization information storage unit 101.

The notification authorization information updating unit 106 includes a notification authorization information checking module 1061, a second notification authorization information creation module 1062, and a second notification authorization information storing module 1063.

The notification authorization information checking module 1061 is configured to check whether or not the authorization information storage unit 101 stores the notification authorization information including a first combination.

The first combination is defined as a combination of the second sender information indicative of the same first device 11 as that indicated by the first destination information of the request authorization information created by the request authorization information creation module 1044, and the notification information indicative of the same processing as that indicated by the request information of the request authorization information created by the request authorization information creation module 1044.

The second notification authorization information creation module 1062 is configured to create additional notification authorization information upon acknowledging that the authorization information storage unit 101 stores the notification authorization information including the first combination. The additional notification authorization information indicates a combination of the first combination and the second destination information indicative of the same second device as that indicated by the first sender information of the request authorization information created by the request authorization information creation module.

The second notification authorization information storing module 1063 is configured to store the additional notification authorization information created by the second notification authorization information creation module 1062 in the authorization information storage unit 101.

The request authorization information updating unit 107 includes a request authorization information checking module 1071, a second request authorization information creation module 1072, and a second request authorization information storing module 1073.

The request authorization information checking module 1071 is configured to check whether or not the authorization information storage unit 101 stores the request authorization information including a second combination.

The second combination is defined as a combination of the first sender information indicative of the same second device 12 as that indicated by the second destination information of the notification authorization information created by the notification authorization information creation module 1054, and the request information indicative of the same processing as that indicated by the notification information of the notification authorization information created by the notification authorization information creation module.

The second request authorization information creation module 1072 is configured to create additional request authorization information upon acknowledging that the authorization information storage unit 101 stores the request authorization information including the second combination. The additional request authorization information indicates a combination of the second combination and the first destination information indicative of the same first device 11 as that indicated by the second sender information of the notification authorization information created by the notification authorization information creation module.

The second request authorization information storing module 1073 is configured to store the additional request authorization information created by the second request authorization information creation module 1072 in the authorization information storage 101.

Figure 2:
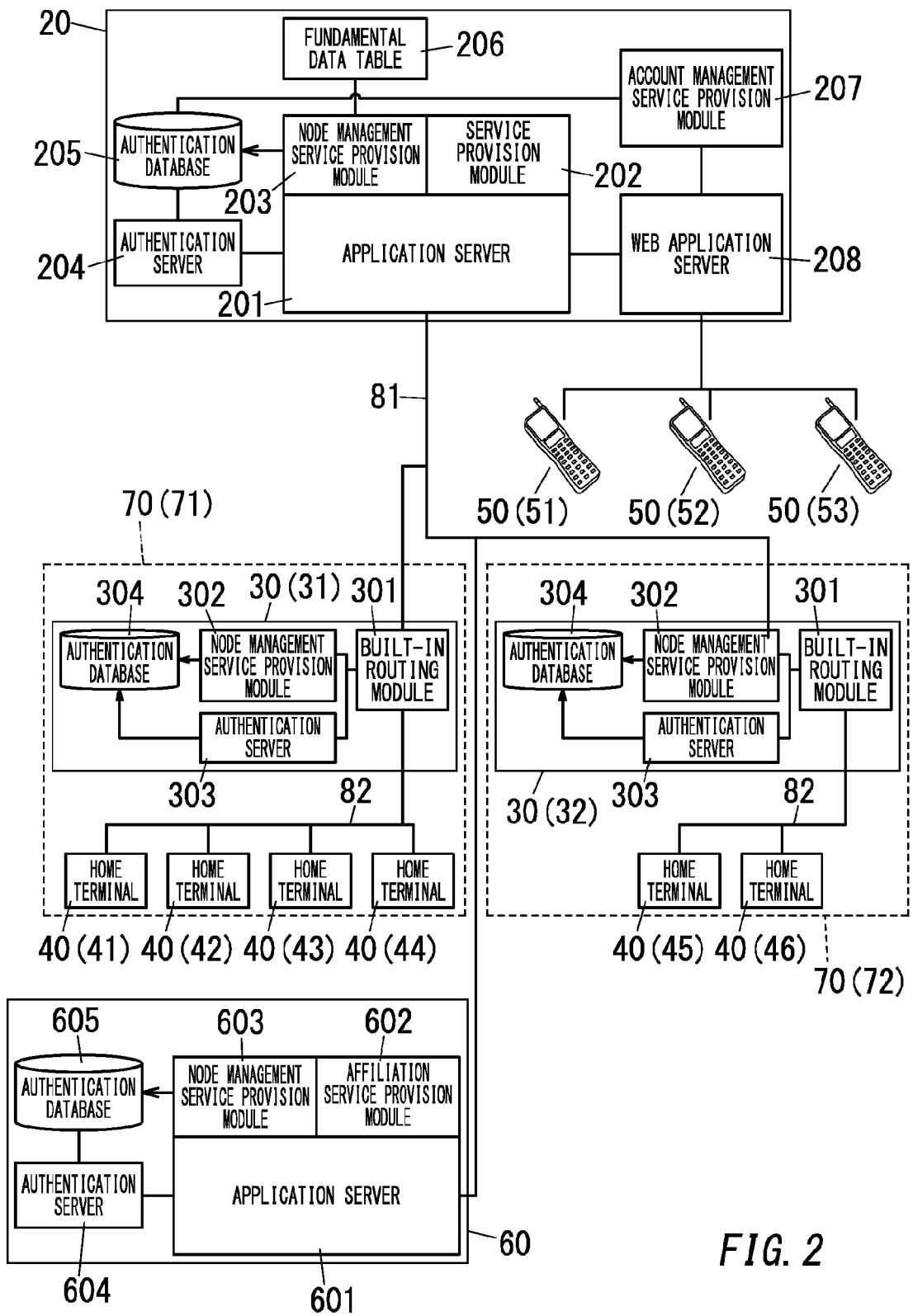
FIG. 2 is a schematic diagram illustrating the above network system.

FIG. 2 illustrates an application example of the above network system. The network shown in FIG. 2 includes a center server 20, a gateway unit (gateway) 30, plural home terminals 40, plural mobile terminals 50, and a service providing server 60.

The center server 20 is connected to the gateway 30 via the Internet 81.

The gateway 30 is connected to the home terminals 40 via a home network installed in a residence 70. The Internet 81 and home network 82 constitute the network 13.

In the following explanation, the plural home terminals 40 are designated by reference numerals 41 to 46, respectively, if necessary. The plural mobile terminals 50 are designated by reference numerals 51 to 53, respectively, if necessary.

The center server 20 manages the home terminals 40 for each residence 70.

The gateway unit 30 is a home server installed in the residence 70 for relaying communication between the home terminal 40 and the center server 20.

FIG. 2 shows the two residences 70. The two residences 70 are designated by reference numerals 71 and 72, respectively, if necessary. The gateway units 30 of the residences 70 are designated by reference numerals 31 and 32, if necessary.

The home terminal 40 and the mobile terminal 50 are devices (network devices) connected to a network. Each of the home terminal 40 and the mobile terminal 50 includes a function unit 111, a notification unit 112, and a request unit 121. In other words, the home terminal 40 and the mobile terminal 50 function as not only the first device 11 but also the second device 12.

The home terminal 40 is placed in each residence 70. The home terminal 40 is a switch, a lighting fixture, a viewer, and a thermometer, for example. The home terminal 40 makes binding communication with at least one of other devices (including the other home terminal 40) via a relay means (e.g., the center server 20 and the gateway unit 30).

The home terminal 40 has a terminal ID (OID) as its identification information. In the present embodiment, the home terminals 41, 42, 43, 44, 45, and 46 has "Device1", "Device2", "Device3", "Device4","Device11", and "Device12", respectively.

The home terminal 40 includes an identification information notification unit (not shown) configured to announce the terminal ID. The identification information notification unit is configured to send an identification signal including terminal information indicative of the terminal ID when the home terminal 40 is connected to the network (home network 82), or when the home terminal 40 receives a request from the center server 20 or the gateway 30. The terminal information may include class information explained in below.

The mobile terminal 50 is used as an interface device for a user who uses the network system. In other words, the mobile terminal 50 is used as a user-specific one, rather than a mere network device, for access to the network as identifying the user. For example, the mobile terminal 50 is a mobile phone and a personal computer.

The request unit 121 of the mobile terminal 50 is configured to send the request signal which includes the first sender information indicative of identification information of the user. The identification information of the user is defined by a terminal ID for the user. In the present embodiment, the terminal ID "USER1" is assigned to the user living in the residence 71, and the terminal ID "USER2" is assigned to the user living in the residence 72.

In addition, the mobile terminal 50 is used as a user interface (requestor) used by the user to request the predetermined service. In this instance, the request unit 121 of the mobile terminal 50 is configured to send the request signal which includes the first sender information indicative of identification information of the service. The first sender information is defined by use of the terminal ID assigned to the user and the identification information of the service.

The center server 20 includes an application server 201, a service provision module 202, a node management service provision module 203, an authentication server 204, an authentication database 205, a fundamental data table (fundamental database) 206, an account management service provision module 207, and a web application server 208.

The application server 201 is a server configured to receive a connection request from each home terminal 40 placed in the residence 70. The application server 201 is a server configured to execute an application (e.g., control of the home terminal 40) in response to a request from the web application server 208. The application server 201 functions as the relay unit 102.

The service provision module 202 is a software module designed to provide plural services (e.g., a function of time-setting, and a function of version management of software) to the home terminal 40 in cooperation with the application server 201. The service provision module 202 and the application server 201 cooperate to provide the cooperation service in which the home terminals 40 placed in the different residences 71 and 72 interact with each other.

Upon receiving notification of addition of the new home terminal 40 (notification indicating that the home terminal 40 has been newly connected to the home network 82), the node management service provision module 203 registers the new home terminal 40 on the authentication database 205. For example, the node management service provision module 203 associates the new home terminal 40 with an account ID, and enables authentication of the new home terminal 40. The node management service provision module 203 stores a class information data table indicative of a correspondence relation between the terminal ID and the class information.

The node management service provision module 203 functions as the request authorization information adding unit 104, the notification authorization information adding unit 105, the notification authorization information updating unit 106, and the request authorization information updating unit 107.

The authentication server 204 is a server configured to detect a connection request from the home terminal 40 to the center server 20, and distribute an encryption key (public key) for encrypted communication.

The authentication database 205 stores the authentication information and the authorization information (permission information) for each of the users using the network system and the home terminals (existing home terminals) 40 being connected to the home network 82. For example, as shown in FIG. 3, the authentication database 205 stores the terminal ID (object ID, OID), an authentication key, permission data, meta-data, and the account ID which are associated with each other. The terminal ID indicates the device to which an access privilege is given. That is, the terminal ID is corresponding to the first sender information or the second sender information.

The authentication key is defined as a secret key or a password used for authentication of terminals. The meta-data indicates the class of devices.

The permission data is expressed as "the terminal ID indicative of the access target device/the function ID/the access privilege information".

The access privilege information indicates existence or nonexistence of each of the access privileges respectively corresponding to four authorization symbols "R", "W", "X", and "P". The access privilege information expressed as "RWXP" means the existence of each of the access privileges respectively corresponding to the authorization symbols "R", "W", "X", and "P". The access privilege information expressed as "R-P" means the existence of each of the access privileges respectively corresponding to the authorization symbols "R" and "P" and the nonexistence of each of the access privileges respectively corresponding to the authorization symbols "W" and "X".

The authorization symbol "R" indicates a privilege of reading out an attribute (property) of the object of the access target device. The attribute of the object includes a feature and a status of the object. The feature of the object is defined as a time independent value (static value). For example, the feature of the object is the kind of the lighting fixture. The status of the object is defined as a time dependent value (dynamic value). For example, the status of the object is a lighting status such as lighting and extinction. The function ID specifies a content of the attribute. Therefore, the authorization symbol "R" means that the device possessing the access privilege is permitted to read out the attribute corresponding to the function ID of the object from the access target device.

The authorization symbol "W" indicates a privilege of writing the attribute of the object of the access target device. The function ID specifies a content of the attribute. Therefore, the authorization symbol "W" means that the device possessing the access privilege is permitted to write the attribute corresponding to the function ID of the object of the access target device.

The authorization symbol "X" indicates a privilege of calling (executing) a method of the object of the access target device. For example, the method of the object is a program (source codes or functions) for realizing "ability of the object" and "function of the object". The function ID specifies the method. Therefore, the authorization symbol "X" means that the device possessing the access privilege is permitted to execute the method corresponding to the function ID of the object of the access target device.

The authorization symbol "P" indicates a privilege of announcing information regarding the function ID to the access target device. In other words, the authorization symbol "P" means that the device possessing the access privilege is permitted to notify the access target device of the information regarding the function ID of the object. For example, the information regarding the function ID is object information such as the attribute of the object and the method of the object. The information regarding the function ID is necessary for requesting the function unit 111 to perform the predetermined processing, or for interpreting a signal obtained from the function unit 111.

In the instance shown in FIG. 3, the permission data of "Device 1" includes "USER1, Device2, Device3/LIGHTING STATUS/-P". Therefore, the home terminal 41 (Device1) is permitted to send the information regarding the function ID (LIGHTING STATUS) to the user (USER1), the home terminal 42 (Device2), and the home terminal 43 (Device3) (authorization symbol "P"). The permission data of "Device1" includes "USER1, Device2, Device3/TERMINAL INFORMATION/RWXP". Therefore, the home terminal 41 (Device1) is permitted to read out the attribute of the object specified by the function ID (TERMINAL INFORMATION) from the user (USER1), the home terminal 42 (Device2), and the home terminal 43 (Device3). In Addition, the home terminal 41 (Device1) is permitted to write the attribute of the object specified by the function ID (TERMINAL INFORMATION) to the user (USER1), the home terminal 42 (Device2), and the home terminal 43 (Device3). Moreover, the home terminal 41 (Device1) is permitted by the user (USER1), the home terminal 42 (Device2), and the home terminal 43 (Device3) to execute the method specified by the function ID (TERMINAL INFORMATION). Further, the home terminal 41 (Device1) is permitted to send the information regarding the function ID (TERMINAL INFORMATION) to the user (USER1), the home terminal 42 (Device2), and the home terminal 43 (Device3).

The access privileges respectively corresponding to the authorization symbols "R", "W", and "X" are defined as a right of requesting the access target device to perform the processing. The aforementioned request information is defined by a combination of the function ID and one of the authorization symbols "R", "W", and "X". The aforementioned first sender information is defined by information indicative of the device (second device) possessing the access privilege. The aforementioned first destination information is defined by information indicative of the access target device (first device).

The access privilege corresponding to the authorization symbol "P" is defined as a privilege of notifying the access target device of predetermined information (e.g., information regarding the function ID). The aforementioned notification information is defined by a combination of the function ID and the authorization symbol "P". The aforementioned second sender information is defined by information indicative of the device (first device) possessing the access privilege. The aforementioned second destination information is defined by information indicative of the access target device (second device).

The authentication database 205 stores the first authorization information (request authorization status) indicative of the combination of the first sender information, the request information, and the first destination information, and the second authorization information (notification authorization status) indicative of the combination of the second sender information, the notification information, and the second destination information. The authentication database 205 functions as the authorization information storage unit 101.

The fundamental data table 206 stores, as shown in FIG. 6, a permission fundamental data (fundamental information) used for creating the authorization information concerning the home terminal 40.

The fundamental information indicates the correspondence relation between the fundamental permission data (e.g., permission data (1) to (4)) and the class information (first class information or second class information) indicative of the class of the device.

The class of the device is corresponding to at least one of the class of the first device 11 and the class of the second device 12. The class of the device is associated with a node class. The node class indicates a classification of the classes of the device. The node class includes "terminal", "user", and "service". The class of the device associated with the node class of "terminal" indicates a part number (or a model number) of the device, for example. The part number of the device includes such as "SWITCH SW112", "LIGHTING LGT321", "VIEWER 345", and "THERMOMETER TM3", for example. The class of the device associated with the node class of "user" indicates a class of the user. The class of the user includes "child user", for example. The class of the device associated with the node class of "service" indicates a class of the service. The class of the service includes "service 1", "service 2", and "service 3", for example. The service1 is defined as a specific service which is provided by a service provider in accordance with implementation agreement. The "service 2" is defined as the cooperation service of performing cooperation between the first and second devices (home terminals 40) respectively placed in different residences 70. In other words, the cooperation service is a service which allows an access is enabled between the home terminals 40 placed in the different residences 71 and 72. The "service 3" is defined as the affiliation service (other provider's service) provided between the home terminal 40 and a service vender (a center server of one of other providers) via the center server 20. In other words, the affiliation service is a service which invokes a part or the whole of function of the home terminal 40 placed in the residence 70.

The fundamental permission data is expressed as "terminal ID indicative of any access target device/function ID/access privilege information". The "terminal ID indicative of any access target device" is expressed as "*" representing a wildcard. In other words, the fundamental permission data is defined as the permission data in which the access target device is not determined. The fundamental permission data denotes at least one of the notification information and the request information.

As described in the above, the fundamental information includes the fundamental notification information and the fundamental request information. The fundamental notification information indicates the correspondence relation between the notification information and the first class information indicative of the class of the first device 11. The fundamental request information indicates the correspondence relation between the request information and the second class information indicative of the class of the second device 12. The fundamental data table 206 is corresponding to the fundamental information storage unit 103.

The fundamental information includes cooperation object information which indicates whether or not the cooperation service is available. In other words, the fundamental information indicates a correspondence relation between the cooperation object information and the class information which includes at least one of the first class information and the second class information.

The fundamental information includes cooperation object information which indicates whether or not the affiliation service is available. In other words, the fundamental information indicates a correspondence relation between the affiliation object information and the class information which includes at least one of the first class information and the second class information.

The class of the device associated with the node class of "user" includes "management user". The fundamental permission data associated with the management user is expressed as "terminal ID indicative of any access target device/any function ID/access privilege information". The "terminal ID indicative of any access target device" and "any function ID" are expressed by use of "*" denoting the wildcard.

The fundamental permission data associated with the child user indicates "*/SWITCH/RWX-", "*/LIGHTING STATUS/R-X-", and "*/TERMINAL INFORMATION/R-".

Accordingly, the user includes the management user (normal user) and the child user (special user). The second class information regarding the child user is correlated to the second class information regarding the management user with respect to a part of the fundamental request information.

In addition, the first class information regarding the child user is correlated to the first class information regarding the management user with respect to a part of the fundamental notification information.

In brief, it is sufficient that the child user is given only a restricted access privilege (i.e., a greater number of access restrictions than those given to the administrative user).

The account management service provision module 207 is a software module of managing an account (account information) of a user (subscriber) who receives a service. The account information is associated with the account ID stored in the authentication database 205. The account management service provision module 207 can associate multiple users with the single account. When a service is newly added, the account management service provision module 207 charges service fee corresponding to the newly added service. The account management service provision module 207 manages a status of the cooperation between the accounts of the residences 71 and 72.

The web application server 208 is defined as a server configured to provide a web page designed to enable the mobile terminal 50 to control the home terminal 40, for example. The web application server 208 provides, to the mobile terminal 50, web pages (input screen) designed for addition of the new service, implementation (validation) of the cooperation service, and implementation (validation) of the affiliation service, for example. The user can add the new service, and implement the cooperation service, and implement the affiliation service, by use of the mobile terminal 50. The web application server 208 provides, to the mobile terminal 50, a webpage designed for a user addition function, too. The user can add a new user by use of the mobile terminal 50.

The gateway 30 is a home gateway. The gateway 30 is configured to perform detection of the home terminal 40, authentication of the home terminal 40, and management of a version of software of the home terminal 40, for example. The gateway 30 includes a built-in routing module 301, a node management service provision module 302, an authentication server 303, and an authentication database 304. In the network system shown in FIG. 2, the gateway 30 detects the device which is newly added to the network, that is, the device (home terminal 40) which is newly connected to the home network 82. Upon detecting the device which is newly added to the network, the gateway 30 notifies the center server 20 of the detection of the new device.

The authentication database 304 stores the authorization information (only the permission information of the home terminal 40 placed in the residence 70) created by the node management service provision module 203 of the center server 20. The authentication database 304 stores the authorization information concerning the account ID associated with the residence 70 in which the gateway 30 is placed. For example, the account ID corresponding to the residence 71 is "USER1". As shown in FIG. 4, the authentication database 304 of the gateway 31 placed in the residence 71 stores the authorization information concerning the account ID of "USER1". The account ID corresponding to the residence 72 is "USER2". As shown in FIG. 5, the authentication database 304 of the gateway placed 32 in the residence 72 stores the authorization information concerning the account ID of "USER2".

The built-in routing module 301 is connected to the center server 20 via the Internet 81. The built-in routing module 301 is connected to the home terminals 40 via the home network

82. The built-in routing module 301 relays communication between the home terminal 40 placed in the residence 70 and the center server 20. The built-in routing module 301 uses the account information of a resident of the residence 70 to communicate with the center server 20.

The built-in routing module 301 is configured to perform access control between the home terminals 40 connected to the home network 82 based on the authorization information stored in the authentication database 304. The built-in routing module 302 acts in a similar manner as the relay unit 102.

In response to detection of the home terminal 40, the node management service provision module 302 registers the detected home terminal 40 with the authentication database 304.

The authentication server 30 authenticates connection from the home terminal 40 to the gateway 30 or the other home terminal 40. The authentication server 303 distributes an encryption key (public key) for establishing encrypted communication. The authentication server 303 is a server module.

The service vender 60 includes an application server 601, an affiliation service provision module 602, a node management service provision module 603, an authentication server 604, and an authentication database 605.

The affiliation service provision module 602 invokes a part or the whole of function (e.g., measurement) of the home terminal 40 placed in the residence 70 for providing a helpful service to the user or the service vender 60. In other words, the affiliation service provision module 602 causes the other service vender 60 to execute an intended operation or operations (e.g., browsing, or controlling) with regard to the home terminal 40.

The following explanation is made to operation of the communication controller 10 of the present embodiment.

For example, the home terminal 44 is newly connected to the home network 82 of the residence 71. Upon the home terminal 44 is connected to the network (home network 82), the home terminal 44 sends the identification signal. Upon receiving the identification signal from the home terminal 44, the gateway 31 transfers the received identification signal to the center server 20. Thus, the node management service provision module 203 of the center server 20 receives the identification signal. Upon receiving the identification signal, the node management service provision module 203 judges that the new device has been added to the network, and starts processing of creating the authorization information for the new device.

The node management service provision module 203 obtains the terminal ID from the received identification signal. The node management service provision module 203 refers to the class information data table and obtains the class information corresponding to the obtained terminal ID (the node management service provision module 203 functions as the second class information obtaining module 1041 and the first class information obtaining module 1051). The terminal ID of the home terminal 44 is "Device4", and the class corresponding to the home terminal 44 is "LIGHTING LGT321".

Further, the node management service provision module 203 makes an association between the terminal ID of the home terminal 44 and the account ID. The node management service provision module 203 associates the terminal ID "Device4" of the home terminal 44 with the account information (account ID "USER1") used by the built-in routing module 301 of the gateway 31 to which the home terminal 44 is connected. The node management service provision module 203 stores the terminal ID of the home terminal 44 and the account ID in the authentication database 205.

The node management service provision module 203 refers to the fundamental information stored in the fundamental data table 206 (fundamental information storage unit 103), and obtains the request information and the notification information corresponding to the class information of the home terminal 44 (the node management service provision module 203 functions as the request information obtaining module 1042 and the notification information obtaining module 1052).

The class "LIGHTING LGT" is associated with the fundamental permission data "*/LIGHTING STATUS/-P" and "*/TERMINAL INFORMATION/RWXP".

Therefore, the node management service provision module 203 obtains the fundamental permission data "*/LIGHTING STATUS/-P" and "*/TERMINAL INFORMATION/RWXP". The fundamental permission data "*/TERMINAL INFORMATION/RWX-" denotes the request information. Each of the fundamental permission data "*/LIGHTING STATUS/-P" and "*/TERMINAL INFORMATION/-P" denotes the notification information.

The node management service provision module 203 refers to the authorization information (notification authorization information) stored in the authentication database 205 (authorization information storage unit 101), and obtains the second sender information (the terminal ID of the device possessing the access privilege) associated with the notification information indicative of the processing (the function ID) same as the processing (the function ID) indicated by the request information which the node management service provision module 203 (request information obtaining module 1042) obtains from the fundamental data table 206 (the node management service provision module 203 functions as the second sender information obtaining module 1043).

When the home terminal 44 has the node class of "terminal", the node management service provision module 203 selects the terminal ID of the access target device of the home terminal 44 from a plurality of the terminal IDs associated with the common account ID given to the same home terminal 44. In other words, the home terminal 44 is not given the access privilege to the home terminals 45 and 46 having the different account ID "USER2" from that of the home terminal 44.

The fundamental permission data indicative of the request information which the node management service provision module 203 obtains from the fundamental data table 206 indicates "*/TERMINAL INFORMATION/RWX-". Therefore, the node management service provision module 203 obtains the terminal ID associated with the notification information indicative of the function ID "TERMINAL INFORMATION". As shown in FIGS. 3 and 7, "Device1", "Device2", and "Device3" are the terminal ID having the function ID "TERMINAL INFORMATION" associated with the authorization symbol "P". Since the "*" denotes any function ID, "USER1" is also included in the terminal ID having the function ID "TERMINAL INFORMATION" associated with the authorization symbol "P".

The node management service provision module 203 refers to the authorization information (request authorization information) stored in the authentication database 205 (authorization information storage unit 101), and obtains the first sender information (the terminal ID of the device having the access privilege) associated with the request information indicative of the processing (the function ID) same as the processing (the function ID) indicated by the notification information which the node management service provision module 203 (notification information obtaining module 1052) obtains from the fundamental data table 206 (the node management service provision module 203 functions as the first sender information obtaining module 1053).

The fundamental permission data indicative of the notification information which the node management service provision module 203 obtains from the fundamental data table 206 indicates "*/LIGHTING STATUS/-P" and "*/TERMINAL INFORMATION/-P". Therefore, the node management service provision module 203 obtains the terminal ID associated with the request information indicative of the function ID "LIGHTING STATUS". As shown in FIGS. 3 and 7, "Device2", "Device3", and "USER1" are the terminal ID having the function ID "LIGHTING STATUS" associated with any one of the authorization symbols "R", "W", and "X". In addition, the node management service provision module 203 obtains the terminal ID associated with the request information indicative of the function ID "TERMINAL INFORMATION". As shown in FIGS. 3 and 7, "Device1", "Device2", "Device3", and "USER1" are the terminal ID having the function ID "TERMINAL INFORMATION" associated with any one of the authorization symbols "R", "W", and "X".

Therefore, the node management service provision module 203 obtains the terminal IDs "Device1", "Device2", "Device3", and "USER1" as the second sender information corresponding to the function ID "TERMINAL INFORMATION". The node management service provision module 203 obtains the terminal IDs "Device 1", "Device2", "Device3", and "USER1" as the first sender information corresponding to the function ID "TERMINAL INFORMATION". The node management service provision module 203 obtains the terminal IDs "Device2", "Device3", and "USER1" as the first sender information corresponding to the function ID "LIGHTING STATUS".

Upon obtaining the second sender information, the node management service provision module 203 creates new request authorization information (the node management service provision module 203 functions as the request authorization information creation module 1044). The new request authorization information indicates the combination of the first sender information (the terminal ID "Device4" of the home terminal 44) indicative of the second device 12 newly added to the network 13, the request information ("*/TERMINAL INFORMATION/RWX-") obtained by the node management service provision module 203 (request information obtaining module 1042), and the first destination information (the terminal IDs "Device1", "Device2", "Device3", and "USER1") indicative of the same first device 11 as that indicated by the second sender information obtained by the node management service provision module 203 (second sender information obtaining module 1043).

In other words, the terminal ID "Device4" is associated with the permission data "USER1, Device1, Device2, Device3/TERMINAL INFORMATION/RWX-".

Upon obtaining the first sender information, the node management service provision module 203 creates new notification authorization information (the node management service provision module 203 functions as the notification authorization information creation module 1054). The new notification authorization information indicates the combination of the second sender information (the terminal ID "Device4" of the home terminal 44) indicative of the first device 11 newly added to the network 13, the notification information ("*/LIGHTING STATUS/-P") obtained by the node management service provision module 203 (notification information obtaining module 1052), and the second destination information (the terminal IDs "Device2", "Device3", and "USER1") indicative of the same second device 12 as that indicated by the first sender information obtained by the node management service provision module 203 (first sender information obtaining module 1053).

In other words, the terminal ID "Device4" is associated with the permission data "USER1, Device2, Device3/LIGHTING STATUS/-P".

Further, the new notification authorization information indicates the combination of the second sender information (the terminal ID "Device4" of the home terminal 44) indicative of the first device 11 newly added to the network 13, the notification information ("*/TERMINAL INFORMATION/-P") obtained by the node management service provision module 203 (notification information obtaining module 1052), and the second destination information (the terminal IDs "Device2", "Device3", and "USER1") indicative of the same second device 12 as that indicated by the first sender information obtained by the node management service provision module 203 (first sender information obtaining module 1053).

In other words, the terminal ID "Device4" is associated with the permission data "USER1, Device1, Device2, Device3/TERMINAL INFORMATION/-P".

As a result, the terminal ID "Device4" is associated with the permission data "USER1, Device1, Device2, Device3/TERMINAL INFORMATION/RWXP" and the permission data "USER1, Device2, Device3/LIGHTING STATUS/-P".

Thus, the authorization information regarding the home terminal 44 newly added to the network is automatically created (see FIG. 10).

FIG. 7 illustrates the permission information stored in the authentication database 205 with regard to the terminal IDs, "USER1", "Device1", "Device2", "Device 3" listed in a column of the figure. Data arranged in a row of the figure include the permission fundamental data given to the newly added home terminal 44. The home terminal 44 is set to include, in the permission fundamental data, the terminal ID (the first or second destination information) which shows a relation (circle mark in FIG. 7) that the provider side authorization symbol "P" corresponds to the requestor side authorization symbols "R", "W", and "X", with regard to the common functional ID. Consequently, the permission data "USER1, Device2, Device3/LIGHTING STATUS/-P" and the permission data "USER1, Device1, Device2, Device3/TERMINAL INFORMATION/RWXP" are created with regard to the new home terminal 44.

As shown in FIG. 10, the node management service provision module 203 stores the authorization information (the request and the notification authorization information) created by the node management service provision module 203 (the request authorization information creation module 1044 and the notification authorization information creation module 1054) in the authentication database 205 (the authorization information storage unit 101). That is, the node management service provision module 203 functions as the request authorization information storing module 1045 and the notification authorization information storing module 1055.

In response to creation of the new authorization information (request authorization information and notification authorization information), the node management service provision module 203 performs processing of updating the existing authorization information. Besides, the permission data associated with the terminal ID "USER1" indicates "*/*/RWXP". Therefore, the processing of updating the authorization information is not performed regarding the terminal ID "USER1".

In response to creation of the new request authorization information, the node management service provision module 203 checks whether or not the authentication database 205 (authorization information storage unit 101) stores the notification authorization information including the first combination (the node management service provision module 203 functions as the notification authorization information checking module 1061).

The first combination is defined as the combination of the second sender information indicative of the same first device 11 as that indicated by the first destination information of the authorization information (request authorization information) created by the node management service provision module 203 (request authorization information creation module 1044), and the notification information indicative of the same processing (function ID) as that indicated by the request information of the authorization information (request authorization information) created by the node management service provision module 203 (request authorization information creation module 1044).

When the home terminal 44 is added, the request information created by the node management service provision module 203 includes the function ID "TERMINAL INFORMATION", and the first destination information corresponding thereto is "Device1", "Device2", and "Device3". The notification information indicative of the processing (the function ID "TERMINAL INFORMATION") same as the processing (the function ID "TERMINAL INFORMATION") indicated by the request information is a combination of the function ID "TERMINAL INFORMATION" and the authorization symbol "P".

As shown in FIG. 3, the authentication database 205 stores the notification authorization information including the first combination.

In this instance, the node management service provision module 203 creates the additional notification authorization information (the node management service provision module 203 functions as the second notification authorization information creation module 1062). The additional notification authorization information indicates the combination of the first combination and the second destination information (i.e., the terminal ID of the home terminal 44 newly added to the network) indicative of the same second device as that indicated by the first sender information of the request authorization information created by the node management service provision module 203 (request authorization information creation module 1044).

In brief, the additional notification authorization information indicates the combination of the second sender information ("Device1", "Device2", and "Device3"), the notification information ("TERMINAL INFORMATION/-P"), and the second destination information ("Device4").

Accordingly, the permission data "Device4/TERMINAL INFORMATION/-P" is given to each of the terminal IDs "Device1", "Device2", and "Device3".

The node management service provision module 203 stores the additional notification authorization information created by the node management service provision module 203 (second notification authorization information creation module 1062) in the authentication database 205 (the authorization information storage unit 101). That is, the node management service provision module 203 functions as the second notification authorization information storing module 1063.

In response to creation of the new notification authorization information, the node management service provision module 203 checks whether or not the authentication database 205 (authorization information storage unit 101) stores the request authorization information including the second combination (the node management service provision module 203 functions as the request authorization information checking module 1071).

The second combination is defined as the combination of the first sender information indicative of the same second device 12 as that indicated by the second destination information of the authorization information (notification request authorization information) created by the node management service provision module 203 (notification authorization information creation module 1054), and the request information indicative of the same processing (function ID) as that indicated by the notification information of the authorization information (notification authorization information) created by the node management service provision module 203 (notification authorization information creation module 1054).

When the home terminal 44 is added, the notification information created by the node management service provision module 203 includes the function IDs "TERMINAL INFORMATION" and "LIGHTING STATUS". The second destination information (terminal ID) corresponding to "TERMINAL INFORMATION" is "Device1", "Device2", and "Device3". The request information indicative of the processing (the function ID "TERMINAL INFORMATION") same as the processing (the function ID "TERMINAL INFORMATION") indicated by the notification information is a combination of the function ID "TERMINAL INFORMATION" and any one of the authorization symbols "R", "W", and "X". The second destination information (terminal ID) corresponding to "LIGHTING STATUS" is "Device2" and "Device3". The request information indicative of the processing (the function ID "LIGHTING STATUS") same as the processing (the function ID "LIGHTING STATUS") indicated by the notification information is a combination of the function ID "LIGHTING STATUS" and any one of the authorization symbols "R", "W", and "X".

As shown in FIG. 3, the authentication database 205 stores the request authorization information including the second combination.

In this instance, the node management service provision module 203 creates the additional request authorization information (the node management service provision module 203 functions as the second request authorization information creation module 1072). The additional request authorization information indicates the combination of the second combination and the first destination information (i.e., the terminal ID of the home terminal 44 newly added to the network) indicative of the same first device 11 as that indicated by the second sender information of the notification authorization information created by the node management service provision module 203 (notification authorization information creation module 1054).

The additional request authorization information indicates the combination of the first sender information ("Device1", "Device2", and "Device3"), the request information ("TERMINAL INFORMATION/RWX-"), and the first destination information ("Device4").

Accordingly, the permission data "Device4/TERMINAL INFORMATION/WX-" is associated with each of the terminal IDs "Device1", "Device2", and "Device3".

The additional request authorization information indicates the combination of the first sender information ("Device2"), the request information ("LIGHTING STATUS/R-"), and the first destination information ("Device4"). In addition, the additional request authorization information indicates the combination of the first sender information ("Device3"), the request information ("LIGHTING STATUS/RWX-"), and the first destination information ("Device4").

The terminal ID "Device2" is associated with the permission data "Device4/LIGHTING STATUS/R-". The terminal ID "Device3" is associated with the permission data "Device4/LIGHTING STATUS/RVVX-".

The node management service provision module 203 stores the additional request authorization information created by the node management service provision module 203 (second request authorization information creation module 1072) in the authentication database 205 (the authorization information storage unit 101). That is, the node management service provision module 203 functions as the second request authorization information storing module 1073.

Thus, in response to creation of the new authorization information (the request or notification authorization information), the existing authorization information is updated automatically (see FIG. 10).

When the node management service provision module 203 adds the authorization information to the authentication database 205, the node management service provision module 203 transmits the newly added authorization information to the gateway 30 associated with the same account ID as that associated with the newly added authorization information. The node management service provision module 302 of the gateway 30 stores the authorization information received from the center server 20 in the authentication database 304. Thereby, the authentication database 304 of the gateway 30 stores the authorization information shown in FIG. 11.

The following explanation is made to operation of the communication controller 10 in a situation where the child user is added as the new user. For example, the management user (the terminal ID "USER1") registers the child user by use of the mobile terminal 50. In this instance, the web application server 208 requests the node management service provision module 203 to add the child user. In response to the request of adding the child user, the node management service provision module 203 judges that the new device (device which the child user uses as the user interface) is added to the network, and starts the processing of creating the authorization information of the new device.

The node management service provision module 203 obtains the terminal ID of the child user from the web application server 208. For example, the terminal ID of the child user is "USER1Child". The node management service provision module 203 refers to the class information data table, and obtains the class information corresponding to the obtained terminal ID. For example, the terminal ID "USER1Child" of the child user is associated with the class "child user".

The node management service provision module 203 makes an association between the terminal ID of the child user and the account ID. The node management service provision module 203 associates the terminal ID "USER1Child" of the child user with the account information (account ID "USER1") of the management user who has registered the child user. The node management service provision module 203 stores the terminal ID of the child user and the account ID in the authentication database 205.

The node management service provision module 203 refers to the fundamental information stored in the fundamental data table 206 (fundamental information storage unit 103), and obtains the request information and the notification information corresponding to the class information of the child user.

The class "child user" is associated with the fundamental permission data "*/SWITCH/RWX-", "*/LIGHTING STATUS/R-X-", and "*/TERMINAL INFORMATION/R-" indicative of the request information.

Therefore, the node management service provision module 203 obtains the fundamental permission data "*/SWITCH/RWX-", "*/LIGHTING STATUS/R-X-", and "*/TERMINAL INFORMATION/R-".

Subsequently, the node management service provision module 203 refers to the authorization information (notification authorization information) stored in the authentication database 205 (authorization information storage unit 101), and obtains the second sender information (the terminal ID of the device possessing the access privilege) associated with the notification information indicative of the processing (the function ID) same as the processing (the function ID) indicated by the request information which the node management service provision module 203 (request information obtaining module 1042) obtains from the fundamental data table 206.

When the node class of the terminal ID is "user", the node management service provision module 203 selects the terminal ID of the access target device of the terminal ID from a plurality of the terminal IDs associated with the common account ID given to the child user. Further, when the node class of the terminal ID is "user", the terminal ID having the node class "user" is exempted out of the access target.

The fundamental permission data indicative of the request information which the node management service provision module 203 obtains from the fundamental data table 206 indicates "*/SWITCH/RWX-", "*/LIGHTING STATUS/R-X-", and "*/TERMINAL INFORMATION/R-".

The node management service provision module 203 obtains the terminal ID associated with the notification information indicative of the function ID "SWITCH".

As shown in FIG. 3, "Device2" is the terminal ID having the function ID "SWITCH" associated with the authorization symbol "P". "Device 1" is the terminal ID having the function ID "LIGHTING STATUS" associated with the authorization symbol "P". "Device 1", "Device2", and "Device3" are the terminal ID having the function ID "TERMINAL INFORMATION" associated with the authorization symbol "P".

The node management service provision module 203 obtains the terminal ID "Device2" as the second sender information corresponding to the function ID "SWITCH". The node management service provision module 203 obtains the terminal ID "Device1" as the second sender information corresponding to the function ID "LIGHTING STATUS". The node management service provision module 203 obtains the terminal IDs "Device1", "Device2", and "Device3" as the second sender information corresponding to the function ID "TERMINAL INFORMATION".

Upon obtaining the second sender information, the node management service provision module 203 creates the new request authorization information. The new request authorization information indicates the combination of the first sender information (the terminal ID "USER1Child" of the child user) indicative of the user newly added to (permitted to use) the network 13, the request information ("*/SWITCH/RWX-") obtained by the node management service provision module 203 (request information obtaining module 1042), and the first destination information (the terminal ID "Device2") indicative of the same first device 11 as that indicated by the second sender information obtained by the node management service provision module 203 (second sender information obtaining module 1043).

In other words, the terminal ID "USER1Child" of the child user is associated with the permission data "Device2/SWITCH/RWX-". Similarly, the terminal ID "USER1Child" of the child user is associated with the permission data "Device1/LIGHTING STATUS/R-X-". Further, the terminal ID "USER1Child" of the child user is associated with the permission data "Device1, Device2, Device3/TERMINAL INFORMATION/R-".

Thus, the authorization information regarding the user (child user) newly added to the network is created automatically.

As shown in FIG. 12, the node management service provision module 203 stores the created authorization information in the authentication database 205. Thereby, the authentication database 205 is updated. Consequently, the permission information of the child user is added to the authentication database 205.

In addition, as described in the above, the node management service provision module 203 performs the processing of updating the existing authorization information. As a result, the terminal ID "Device1" is associated with the permission data "USER1Child/LIGHTING STATUS/-P" and "USER1Child/TERMINAL INFORMATION/-P". The terminal ID "Device2" is associated with the permission data "USER1Child/SWITCH/-P" and "USER1Child/TERMINAL INFORMATION/-P". The terminal ID "Device3" is associated with the permission data "USER1Child/TERMINAL INFORMATION/-P".

As apparent from the above, in response to creation of the new authorization information, the existing authorization information is updated automatically (see FIG. 12).

When the node management service provision module 203 adds the authorization information to the authentication database 205, the node management service provision module 203 transmits the newly added authorization information to the gateway 30 associated with the same account ID as that associated with the newly added authorization information. The node management service provision module 302 of the gateway 30 stores the authorization information received from the center server 20 in the authentication database 304.

The following explanation is made to operation of the communication controller 10 in a situation where the specific service is added as the new service. For example, the user requests the center server 20 to add (enable) the specific service by user of the mobile terminal 50. In this instance, the account management service provision module 207 charges the user, for example. In response to payment of the user, the account management service provision module 207 requests the node management service provision module 203 to add the specific service. In response to the request of adding the specific service, the node management service provision module 203 judges that the new device (device which the user uses as the user interface) is added to the network, and starts the processing of creating the authorization information of the new device.

The node management service provision module 203 obtains the terminal ID of the service which the node management service provision module 203 is requested to add. The terminal ID of the specific service is assigned to not a real device but a virtual device. The terminal ID of the specific service is expressed as "account name@service name". When the service name of the specific service is "Service1" and the account name of the user is "USER1", the terminal ID of the specific service is expressed as "USER 1@Service1".

The node management service provision module 203 refers to the class information data table, and obtains the class information corresponding to the obtained terminal ID. For example, the specific service is associated with the class "service1".

The node management service provision module 203 makes an association between the terminal ID of the specific service and the account ID. The node management service provision module 203 associates the terminal ID "USER1@Service1" of the specific service with the account information (account ID "USER1") of the user who requests addition of the specific service. The node management service provision module 203 stores the terminal ID of the specific service and the account ID in the authentication database 205.

The node management service provision module 203 refers to the fundamental information stored in the fundamental data table 206, and obtains the request information and the notification information corresponding to the class information of the specific service.

The class "service1" is associated with the fundamental permission data "*/SWITCH/R-X-". This fundamental permission data indicates the request information. In other words, no notification information is associated with the class "service1".

Therefore, the node management service provision module 203 obtains the fundamental permission data "*/SWITCH/R-X-".

Subsequently, the node management service provision module 203 refers to the authorization information (notification authorization information) stored in the authentication database 205 (authorization information storage unit 101), and obtains the second sender information (the terminal ID of the device possessing the access privilege) associated with the notification information indicative of the processing (the function ID) same as the processing (the function ID) indicated by the request information which the node management service provision module 203 (request information obtaining module 1042) obtains from the fundamental data table 206.

The fundamental permission data indicative of the request information which the node management service provision module 203 obtains from the fundamental data table 206 denotes "*/SWITCH/R-X-".

The node management service provision module 203 obtains the terminal ID associated with the notification information indicative of the function ID "SWITCH".

As shown in FIG. 3, "Device2" and "USER1" are the terminal ID having the function ID "SWITCH" associated with the authorization symbol "P".

The node management service provision module 203 obtains the terminal IDs "Device2" and "USER1" as the second sender information corresponding to the function ID "SWITCH".

Upon obtaining the second sender information, the node management service provision module 203 creates the new request authorization information. The new request authorization information indicates the combination of the first sender information (the terminal ID "USER1@Service1" of the specific service) indicative of the service newly added to (available via) the network 13, the request information ("*/SWITCH/R-X-") obtained by the node management service provision module 203 (request information obtaining module 1042), and the first destination information (the terminal IDs "Device2" and "USER1") indicative of the same first device 11 as that indicated by the second sender information obtained by the node management service provision module 203 (second sender information obtaining module 1043).

In other words, the terminal ID "USER1@Service1" of the specific service is associated with the permission data "USER1, Device2/SWITCH/R-X-".

Thus, the authorization information regarding the service (specific service) newly added to the network is created automatically.

As shown in FIG. 13, the node management service provision module 203 stores the created authorization information in the authentication database 205. Thereby, the authentication database 205 is updated. Consequently, the permission information of the specific service is added to the authentication database 205.

Consequently, in order to enable the new service by the center server 20, the node management service provision module 203 creates the permission information regarding the new service automatically and stores the same in the authentication database 205. Thereby, the new service becomes available. In other words, it is possible to browse and control the home terminal 40 by user of the new service. Further, it is possible to enjoy the new service via the home terminal 40.

In addition, as described in the above, the node management service provision module 203 performs the processing of updating the existing authorization information. As a result, the terminal ID "Device2" is associated with the permission data "USER1@Service1/SWITCH/-P".

As described in the above, when the new authorization information is created, the existing authorization information is updated automatically (see FIG. 13).

When the node management service provision module 203 adds the authorization information to the authentication database 205, the node management service provision module 203 transmits the newly added authorization information to the gateway 30 associated with the same account ID as that associated with the newly added authorization information. The node management service provision module 302 of the gateway 30 stores the authorization information received from the center server 20 in the authentication database 304.

The following explanation is made to operation of the communication controller 10 in a situation where the communication controller 10 is requested to implement the cooperation service as the new service. For example, the user requests the center server 20 to implement the cooperation service by use of the mobile terminal 50. In this instance, the account management service provision module 207 charges the user, for example. In response to payment of the user, the account management service provision module 207 requests the node management service provision module 203 to implement the cooperation service. In response to the request of implementing the cooperation service, the node management service provision module 203 judges that the new device (device which the user uses as the user interface) is added to the network, and starts the processing of creating the authorization information of the new device. The cooperation service is not available unless the users of the residences 71 and 72 request to implement the cooperation service.

The node management service provision module 203 obtains the terminal ID of the service which the node management service provision module 203 is requested to add. The terminal ID of the cooperation service is not assigned to a real device. Like the terminal ID of the specific service, the terminal ID of the cooperation service is expressed as "account name@service name". When the service name of the cooperation service is "Service2" and the account name of the user of the residence 71 is "USER1", the terminal ID of the cooperation service is expressed as "USER 1@Service2". Further, the terminal ID of the cooperation service given to the user of the residence 72 is "USER2@Service2".

The node management service provision module 203 refers to the class information data table, and obtains the class information corresponding to the obtained terminal ID. For example, the cooperation service is associated with the class "service2".

The node management service provision module 203 makes an association between the terminal ID of the cooperation service and the account ID. The node management service provision module 203 associates the account IDs "USER1" and "USER2" of the users who request addition of the cooperation service with the corresponding terminal IDs "USER1@Service2" and "USER2@Service2" of the cooperation targets, respectively. The node management service provision module 203 stores the terminal ID of the cooperation service and the account ID in the authentication database 205.

The node management service provision module 203 refers to the fundamental information stored in the fundamental data table 206, and obtains the request information and the notification information corresponding to the class information of the cooperation service.

The class "service2" is associated with the fundamental permission data "*/SWITCH/RWX-" and "*/LIGHTING STATUS/RWX-". This fundamental permission data indicates the request information. In other words, no notification information is associated with the class "service2".

Therefore, the node management service provision module 203 obtains the fundamental permission data "*/SWITCH/RWX-" and "*/LIGHTING STATUS/RWX-".

The node management service provision module 203 refers to the authorization information (notification authorization information) stored in the authentication database 205 (authorization information storage unit 101), and obtains the second sender information (the terminal ID of the device possessing the access privilege) associated with the notification information indicative of the processing (the function ID) same as the processing (the function ID) indicated by the request information which the node management service provision module 203 (request information obtaining module 1042) obtains from the fundamental data table 206.

The fundamental permission data indicative of the request information which the node management service provision module 203 obtains from the fundamental data table 206 indicates "*/SWITCH/RWX-" and "*/LIGHTING STATUS/RWX-".

The node management service provision module 203 obtains the terminal ID associated with the notification information indicative of the function ID "SWITCH".

As shown in FIG. 3, "Device2" and "Device 12" are the terminal ID having the function ID "SWITCH" associated with the authorization symbol "P". "Device1" and "Device 11" are the terminal ID having the function ID "LIGHTING STATUS" associated with the authorization symbol "P".

Therefore, the node management service provision module 203 obtains the terminal IDs "Device2" and "Device12" as the second sender information corresponding to the function ID "SWITCH" with respect to the terminal IDs "USER2@Service2" and "USER1@Service2". The node management service provision module 203 obtains the terminal IDs "Device1" and "Device11" as the second sender information corresponding to the function ID "LIGHTING STATUS" with respect to the terminal IDs "USER2@Service2" and "USER 1@Service2".

Further, the node management service provision module 203 refers to the fundamental request information stored in the fundamental database 206, and selects the home terminal 40 corresponding to the class information available for the cooperation service from the home terminals 40 indicated by the second sender information obtained by the node management service provision module 203. The home terminals 41, 42, 45, and 46 having the terminal IDs "Device1", "Device2", "Device11", and "Device 12" are available for the cooperation service (service2), respectively.

Consequently, the node management service provision module 203 retrieves the permission fundamental data of the class information assigned to the cooperation service from the fundamental data table 206. Also, regarding the enabled cooperation service, the node management service provision module 203 retrieves, from the fundamental data table 206, the part number (terminal ID) of the home terminal 40 designated as a cooperation target. The node management service provision module 203 refers to the meta-data of the authentication database 205, and retrieves, from the authentication database 205, the terminal ID belonging to each of the account IDs designated as the service target in the cooperation service.

Thus, the terminal IDs "Device1" and "Device2" are selected for the account ID "USER1". The terminal IDs "Device 11" and "Device 12" are selected for the account ID "USER2".

Upon obtaining the second sender information, the node management service provision module 203 creates the new request information as mentioned in the above.

As a result, the terminal ID "USER 1@Service2" of the cooperation service is associated with the permission data "Device 11/LIGHTING STATUS/RWX-" and "Device 12/SWITCH/RWX-". The terminal ID "USER2@Service2" is associated with the permission data "Device1/LIGHTING STATUS/RWX-" and "Device2/SWITCH/RWX-".

Thus, the authorization information regarding the service (cooperation service) newly added to the network is created automatically.

As shown in FIG. 14, the node management service provision module 203 stores the created authorization information in the authentication database 205. Thereby, the authentication database 205 is updated. Consequently, the permission information of the cooperation service is added to the authentication database 205.

In addition, as described in the above, the node management service provision module 203 performs the processing of updating the existing authorization information.

As a result, the terminal ID "Device 1" is associated with the permission data "USER2@Service2/LIGHTING STATUS/-P". The terminal ID "Device2" is associated with the permission data "USER2@Service2/SWITCH/-P". The terminal ID "Device11" is associated with the permission data "USER1@Service2/LIGHTING STATUS/-P". The terminal ID "Device12" is associated with the permission data "USER1@Service2/SWITCH/-P".

As described in the above, when the new authorization information is created, the existing authorization information is updated automatically (see FIG. 14).

When the node management service provision module 203 adds the authorization information to the authentication database 205, the node management service provision module 203 transmits the newly added authorization information to the gateway 30 associated with the same account ID as that associated with the newly added authorization information. The node management service provision module 302 of the gateway 30 stores the authorization information received from the center server 20 in the authentication database 304.

Thus, as shown in FIG. 15, the terminal ID "USER2@Service2" of the cooperation service is registered with the authentication database 304 of the gateway 31 of the residence 71. In addition, the terminal ID "USER2@Service2" of the cooperation service is added to the authorization information regarding each of the home terminals 41 and 42 selected as the cooperation target. As shown in FIG. 16, the terminal ID "USER1@Service2" of the cooperation service is registered with the authentication database 304 of the gateway 32 of the residence 72. In addition, the terminal ID "USER1@Service2" of the cooperation service is added to the authorization information regarding each of the home terminals 45 and 46 selected as the cooperation target.

As described in the above, in response to the request of enabling the cooperation service, the node management service provision module 203 retrieves, from the fundamental data table 206, the permission fundamental data associated with the class information of the cooperation service. The node management service provision module 203 selects the target for the retrieved permission fundamental data from the home terminals 40 placed in the residence 70 and included in the authentication database 205. The permission fundamental data combined with the target is added to the authentication database 205 as the permission information of the cooperation service.

In order to enable cooperation between the home terminals 40 respectively placed in the different residences 71 and 72 via the center server 20, the node management service provision module 203 creates the permission information of enabling the target to browse and control for the home terminals 40 respectively placed in the residences 71 and 72. In other words, the node management service provision module 203 enables the user to browse and control the home terminal 40 of the other residence 71 or 72 by use of the cooperation service. Additionally, the node management service provision module 203 enables the user to use the function of the cooperation service from the home terminal 40.

The following explanation is made to operation of the communication controller 10 in a situation where the communication controller 10 is requested to implement the affiliation service as the new service. Besides, in the following explanation, the home terminal 44 has the class of "THERMOMETER TM3".

For example, the user requests the center server 20 to implement the affiliation service by use of the mobile terminal 50. In this instance, the account management service provision module 207 charges the user, for example. In response to payment of the user, the account management service provision module 207 requests the node management service provision module 203 to implement the affiliation service. In response to the request of implementing the affiliation service, the node management service provision module 203 judges that the new device (device which the user uses as the user interface) is added to the network, and starts the processing of creating the authorization information of the new device.

The node management service provision module 203 obtains the terminal ID of the service which the node management service provision module 203 is requested to add. Like the terminal ID of the specific service, the terminal ID of the affiliation service is expressed as "account name@service name". When the service name of the affiliation service is "Service3" and the account name of the user of the residence 71 is "Vender", the terminal ID of the affiliation service is "Vender@Service3".

The node management service provision module 203 refers to the class information data table, and obtains the class information corresponding to the obtained terminal ID. For example, the affiliation service is associated with the class "service3", as shown in FIG. 6.

The node management service provision module 203 makes an association between the terminal ID of the affiliation service and the account ID. The node management service provision module 203 associates the terminal ID "Vender@Service3" of the affiliation service with the account information (account ID "USER1") of the user who is asked to add the affiliation service. The node management service provision module 203 stores the terminal ID of the affiliation service and the account ID in the authentication database 205.

The node management service provision module 203 refers to the fundamental information stored in the fundamental data table 206, and obtains the request information and the notification information corresponding to the class information of the affiliation service.

The class "service3" is associated with the fundamental permission data "*/THERMOMETER/R-". This fundamental permission data indicates the request information. In other words, no notification information is associated with the class "service3".

Therefore, the node management service provision module 203 obtains the fundamental permission data "*/THERMOMETER/R-".

Thereafter, the node management service provision module 203 refers to the authorization information (notification authorization information) stored in the authentication database 205 (authorization information storage unit 101), and obtains the second sender information (the terminal ID of the device possessing the access privilege) associated with the notification information indicative of the processing (the function ID) same as the processing (the function ID) indicated by the request information which the node management service provision module 203 (request information obtaining module 1042) obtains from the fundamental data table 206.

The fundamental permission data indicative of the request information which the node management service provision module 203 obtains from the fundamental data table 206 indicates "*/THERMOMETER/R-".

The node management service provision module 203 obtains the terminal ID associated with the notification information indicative of the function ID "THERMOMETER".

As shown in FIG. 17, "Device4" is the terminal ID having the function ID "THERMOMETER" associated with the authorization symbol "P".

The node management service provision module 203 obtains the terminal ID "Device4" as the second sender information corresponding to the function ID "THERMOMETER".

Consequently, the node management service provision module 203 retrieves, from the fundamental data table 206, the part number (class) of the home terminal 44 designated as an affiliation target (object). The node management service provision module 203 refers to the class of the device indicated by the meta-data stored in the authentication database 205, and retrieves, from the authentication database 205, the terminal ID belonging to the account ID designated as the affiliation target of the affiliation service.

Upon obtaining the second sender information, the node management service provision module 203 creates the new request information as mentioned in the above.

As a result, the terminal ID "Vender@Service3" of the affiliation service is associated with the permission data "Device4/THERMOMETER/R-".

Thus, the authorization information regarding the service (affiliation service) newly added to the network is created automatically.

As shown in FIG. 17, the node management service provision module 203 stores the created authorization information in the authentication database 205. Thereby, the authentication database 205 is updated. Consequently, the permission information of the affiliation service is added to the authentication database 205.

Consequently, in order to enable the affiliation service by the center server 20, the node management service provision module 203 creates the permission information regarding the affiliation service automatically and stores the same in the authentication database 205. Thereby, the affiliation service becomes available.

In addition, as described in the above, the node management service provision module 203 updates the existing authorization information. As a result, the terminal ID "Device4" is associated with the permission data "Vender@Service3/THERMOMETER/-P".

As described in the above, when the new authorization information is created, the existing authorization information is updated automatically (see FIG. 17).

When the node management service provision module 203 adds the authorization information to the authentication database 205, the node management service provision module 203 transmits the newly added authorization information to the gateway 30 associated with the same account ID as that associated with the newly added authorization information. The node management service provision module 302 of the gateway 30 stores the authorization information received from the center server 20 in the authentication database 304.

In other words, the terminal ID "Vender@Service3" of the affiliation service is registered with the authentication database 304 of the gateway 31, too.

Accordingly, for implementing the affiliation service (the other provider's service) between the home terminal 40 and the other service vender (the center server of the other service provider) 60 through the center server 20, the permission information of the affiliation service is added to the authentication data base 205 automatically. Thus, the affiliation service is implemented while providing only the required information of the home terminal 40 to the service vendor 60.

Next, an explanation is made to operation of the network system shown in FIG. 2.

The home terminal (lighting fixture) 41 sends the notification signal. The notification signal includes the second sender information (the terminal ID "Device1" of the home terminal 41), the notification information (the function ID "LIGHTING STATUS" and the authorization symbol "P"), and the second destination information (the terminal ID "Device3" of the home terminal 43).

The gateway 31 receives the notification signal from the home terminal 41 via the home network 82. Upon receiving the notification signal, the gateway 31 refers to the authentication database 304, and judges whether or not the home terminal 41 possesses the access privilege to the home terminal 43 regarding the authorization symbol "P". With reference to FIG. 4, the home terminal 41 possesses the access privilege to the home terminal 43 regarding the authorization symbol "P". Therefore, the gateway 31 transfers the notification signal from the home terminal 41 to the home terminal 43.

Thus, the home terminal 43 receives the notification signal from the home terminal 41. The home terminal 43 can obtain information concerning the function ID "LIGHTING STATUS" of the home terminal 41 by means of receiving the notification signal from the home terminal 41. As a result, the home terminal 43 can enjoy the service designated by the function ID "LIGHTING STATUS" from the home terminal 41. In other words, the home terminal 43 can request the home terminal 41 to provide the service designated by the function ID "LIGHTING STATUS".

In order to display the lighting status of the home terminal (lighting fixture) 41 on the home terminal (viewer) 43, the home terminal 43 is controlled to send the request signal. The request signal includes the first sender information (the terminal ID "Device3" of the home terminal 43), the request information (the function ID "LIGHTING STATUS" and the authorization symbol "R"), and the first destination information (the terminal ID "Device1" of the home terminal 41).

The gateway 31 receives the request signal from the home terminal 43 via the home network 82. Upon receiving the request signal, the gateway 31 refers to the authentication database 304, and judges whether or not the home terminal 43 possesses the access privilege to the home terminal 41 regarding the authorization symbol "R". With reference to FIG. 4, the home terminal 43 possesses the access privilege to the home terminal 41 regarding the authorization symbol "R". Therefore, the gateway 31 transfers the request signal from the home terminal 43 to the home terminal 41.

Upon receiving the request signal, the home terminal 41 monitors the lighting status of the object, thereby obtaining the lighting status. The home terminal 41 sends the response signal which includes information indicative of the lighting status.

The gateway 31 receives the response signal from the home terminal 41 through the home network 82. Upon receiving the response signal, the gateway 41 transfers the response signal to the home terminal 43. Upon receiving the response signal, the home terminal 43 displays the lighting status of the home terminal 41.

As explained in the above, the communication controller 10 of the present embodiment is used in the network system including the first device (provider side device) 11 configured to perform the predetermined processing and the second device (requestor side device) 12 configured to request the first device 11 to perform the predetermined processing.

The communication controller 10 includes the authorization information storage unit 101, the relay unit 102 configured to relay between the first device 11 and the second device 12 via the network 13, the fundamental information storage unit 103, the request authorization information adding unit 104, the notification authorization information adding unit 105, the notification authorization information updating unit 106, and the request authorization information updating unit 107.

The authorization information storage unit 101 is configured to store the first authorization information indicative of the combination of the first sender information, the request information, and the first destination information, and the second authorization information indicative of the combination of the second sender information, the notification information, and the second destination information.

The relay unit 102 includes the request signal relay module 1021 and the notification signal relay module 1022.

The request signal relay module 1021 is configured to, upon receiving the request signal, check whether or not the request authorization information includes the same combination of the first sender information, the request information, and the first destination information as that indicated by the received request signal. The request signal relay module 1021 is configured to relay the received request signal upon acknowledging that the request authorization information includes the same combination of the first sender information, the request information, and the first destination information as that indicated by the received request signal.

The notification signal relay module 1022 is configured to, upon receiving the notification signal, check whether or not the notification authorization information includes the same combination of the second sender information, the notification information, and the second destination information as that indicated by the received notification signal. The notification signal relay module 1022 is configured to relay the received notification signal upon acknowledging that the notification authorization information includes the same combination of the second sender information, the notification information, and the second destination information as that indicated by the received notification signal.

The fundamental information storage unit 103 is configured to store the fundamental notification information and the fundamental request information. The fundamental notification information indicates the correspondence relation between the notification information and the first class information. The first class information indicates the class of the first device 11. The fundamental request information indicates the correspondence relation between the request information and the second class information. The second class information indicates the class of the second device 12.

The request authorization information adding unit 104 includes the second class information obtaining module 1041, the request information obtaining module 1042, the second sender information obtaining module 1043, the request authorization information creation module 1044, and the request authorization information storing module 1045.

The second class information obtaining module 1041 is configured to obtain the second class information of the second device 12 which is newly added to the network 13.

The request information obtaining module 1042 is configured to refer to the fundamental request information stored in the fundamental information storage unit 103, and obtain the request information corresponding to the second class information obtained by the second class information obtaining module 1041.

The second sender information obtaining module 1043 is configured to refer to the notification authorization information stored in the authorization information storage unit 101, and obtain the second sender information which is associated with the notification information indicative of the same processing as that indicated by the request information obtained by the request information obtaining module 1042.

The request authorization information creation module 1044 is configured to create the new request authorization information. The new request authorization information indicates the combination of the first sender information indicative of the second device 12 newly added to the network 13, the request information obtained by the request information obtaining module, and the first destination information indicative of the same first device 11 as that indicated by the second sender information obtained by the second sender information obtaining module.

The request authorization information storing module 1045 is configured to store the request authorization information created by the request authorization information creation module 1044 in the authorization information storage unit 101.

The notification authorization information adding unit 105 includes the first class information obtaining module 1051, the notification information obtaining module 1052, the first sender information obtaining module 1053, the notification authorization information creation module 1054, and the notification authorization information storing module 1055.

The first class information obtaining module 1051 is configured to obtain the first class information of the first device 11 which is newly added to the network 13.

The notification information obtaining module 1052 is configured to refer to the fundamental notification information stored in the fundamental information storage unit 103, and obtain the notification information corresponding to the first class information obtained by the first class information obtaining module 1051.

The first sender information obtaining module 1053 is configured to refer to the request authorization information stored in the authorization information storage unit 101, and obtain the first sender information which is associated with the request information indicative of the same processing as that indicated by the notification information obtained by the notification information obtaining module 1052.

The notification authorization information creation module 1054 is configured to create the new notification authorization information. The new notification authorization information indicates the combination of the second sender information indicative of the first device 11 newly added to the network 13, the notification information obtained by the notification information obtaining module, and the second destination information indicative of the same second device 12 as that indicated by the first sender information obtained by the first sender information obtaining module.

The notification authorization information storing module 1055 is configured to store the notification authorization information created by the notification authorization information creation module 1054 in the authorization information storage unit 101.

According to the present embodiment, the communication controller 10 (and the network system including the communication controller 10) can create the authorization information concerning the new home terminal 40 automatically. Therefore, it is unnecessary to manually create the complicated permission information which correlates the new home terminal 40 to each of the existing home terminal 40, the user, and the new home terminal 40.

The communication controller 10 of the present embodiment further includes the notification authorization information updating unit 106 and the request authorization information updating unit 107.

The notification authorization information updating unit 106 includes the notification authorization information checking module 1061, the second notification authorization information creation module 1062, and the second notification authorization information storing module 1063.

The notification authorization information checking module 1061 is configured to check whether or not the authorization information storage unit 101 stores the notification authorization information including the first combination.

The first combination is defined as the combination of the second sender information indicative of the same first device 11 as that indicated by the first destination information of the request authorization information created by the request authorization information creation module 1044,, and the notification information indicative of the same processing as that indicated by the request information of the request authorization information created by the request authorization information creation module 1044.

The second notification authorization information creation module 1062 is configured to create the additional notification authorization information upon acknowledging that the authorization information storage unit 101 stores the notification authorization information including the first combination. The additional notification authorization information indicates the combination of the first combination and the second destination information indicative of the same second device 12 as that indicated by the first sender information of the request authorization information created by the request authorization information creation module.

The second notification authorization information storing module 1063 is configured to store the additional notification authorization information created by the second notification authorization information creation module 1062 in the authorization information storage unit 101.

The request authorization information updating unit 107 includes the request authorization information checking module 1071, the second request authorization information creation module 1072, and the second request authorization information storing module 1073.

The request authorization information checking module 1071 is configured to check whether or not the authorization information storage unit 101 stores the request authorization information including the second combination.

The second combination is defined as a combination of the first sender information indicative of the same second device 12 as that indicated by the second destination information of the notification authorization information created by the notification authorization information creation module 1054, and the request information indicative of the same processing as that indicated by the notification information of the notification authorization information created by the notification authorization information creation module.

The second request authorization information creation module 1072 is configured to create the additional request authorization information upon acknowledging that the authorization information storage unit 101 stores the request authorization information including the second combination. The additional request authorization information indicates a combination of the second combination and the first destination information indicative of the same first device 11 as that indicated by the second sender information of the notification authorization information created by the notification authorization information creation module.

The second request authorization information storing module 1073 is configured to store the additional request authorization information created by the second request authorization information creation module 1072 in the authorization information storage 101.

Accordingly, upon addition of the new home terminal 40, the communication controller 10 of the present embodiment can modify the permission information for the home terminal 40 already connected to the home network 82 so as to include information about the new home terminal 40.

The notification authorization information creation module 1054 is configured to, upon judging that the second device 12 has the class of the user, select the identification information of the user as the first sender information of the request authorization information.

The notification authorization information creation module 1054 is configured to, upon judging that the first device 11 has the class of the user, select the identification information of the user as the second sender information of the notification authorization information.

The user includes the normal user and the specific user. The second type information indicative of the special user is configured to be associated in common with a part of the fundamental request information associated with the second type information indicative of the normal user.

Accordingly, the communication controller 10 of the present embodiment can create different authorization restrictions (access restrictions) for the specific user (child user) and the normal user (management user).

Especially, the second class information obtaining module 1041 is configured to, in response to the request of adding the service, obtain the second class information corresponding to the service. The request authorization information creation module 1044 is configured to, upon judging that the second device 12 has the class of the service, select the information defined by the identification information of the service as the first sender information of the request authorization information.

In addition, the first class information obtaining module 1051 is configured to, in response to the request of adding the service, obtain the first class information corresponding to the service. The notification authorization information creation module 1054 is configured to, upon judging that the first device 11 has the class of the service, select the information defined by the identification information of the service as the second sender information of the notification authorization information.

Accordingly, the communication controller 10 of the present embodiment can enable the specific service in response to conclusion of implementation agreement with the service provider. In other words, the communication controller 10 can enable the specific service in response to the request from the service provider.

Particularly, the second class information obtaining module 1041 is configured to, in response to the request of implementing the cooperation service, obtain the second class information corresponding to the requested cooperation service. The request authorization information creation module 1044 is configured to, upon acknowledging that the second device 12 has the class of the cooperation service, refer to the fundamental request information stored in the fundamental information storage unit 103, and select the first device 11 corresponding to the first class information available for the cooperation service from the first devices 11 indicated by the second sender information obtained by the second sender information obtaining module 1043. The request authorization information creation module 1044 is configured to create the request authorization information indicative of the combination of the first sender information defined by the identification information of the cooperation service, the request information obtained by the request information obtaining module 1042, and the first destination information indicative of the first device 11 selected by the request authorization information creation module 1044.

Moreover, the first class information obtaining module 1051 is configured to, in response to the request of implementing the cooperation service, obtain the first class information corresponding to the requested cooperation service. The notification authorization information creation module 1054 is configured to, upon acknowledging that the first device 11 has the class of the cooperation service, refer to the fundamental notification information stored in the fundamental information storage unit 103, and select the second device 12 corresponding to the second class information available for the cooperation service from the second devices 12 indicated by the first sender information obtained by the first sender information obtaining module 1053. The notification authorization information creation module 1054 is configured to create the notification authorization information indicative of the combination of the second sender information defined by the identification information of the cooperation service, the notification information obtained by the notification information obtaining module 1052, and the second destination information indicative of the second device 12 selected by the notification authorization information creation module 1054.

Consequently, the communication controller 10 of the present embodiment can make access to the home terminals 40 placed in the different residences 71 and 72. Thus, the home terminals 40 placed in the different residences 71 and 72 can make access to each other. Therefore, it is possible to browse the information of the home terminal 40 placed in the other residence 70 and to control the home terminal 40 placed in the other residence 70. In addition, the permission information can be created appropriately regarding the cooperation (area cooperation) of the residences 71 and 72. The home terminals 40 of the residences 71 and 72 are prohibited from browsing and controlling the irrelevant home terminal 40. Accordingly, it is possible to avoid privacy issues.

Especially, the second class information obtaining module 1041 is configured to, in response to the request of implementing the affiliation service, obtain the second class information corresponding to the requested affiliation service. The request authorization information creation module 1044 is configured to, upon acknowledging that the second device 12 has the class of the affiliation service, refer to the fundamental request information stored in the fundamental information storage unit 103, and select the first device 11 corresponding to the first class information available for the affiliation service from the first devices indicated by the second sender information obtained by the second sender information obtaining module 1043. The request authorization information creation module 1044 is configured to create the request authorization information indicative of the combination of the first sender information defined by the identification information of the affiliation service, the request information obtained by the request information obtaining module 1042, and the first destination information indicative of the first device 11 selected by the request authorization information creation module 1044.

Moreover, the first class information obtaining module 1051 is configured to, in response to the request of implementing the affiliation service, obtain the first class information corresponding to the requested affiliation service. The notification authorization information creation module 1054 is configured to, upon acknowledging that the first device 11 has the class of the affiliation service, refer to the fundamental notification information stored in the fundamental information storage unit 103, and select the second device 12 corresponding to the second class information available for the affiliation service from the second devices 12 indicated by the first sender information obtained by the first sender information obtaining module 1053. The notification authorization information creation module 1054 is configured to create the notification authorization information indicative of the combination of the second sender information defined by the identification information of the affiliation service, the notification information obtained by the notification information obtaining module 1052, and the second destination information indicative of the second device 12 selected by the notification authorization information creation module 1054.

Consequently, the communication controller 10 according to the present embodiment can create the affiliation object information appropriately in order to create the permission information which enables to provide only the information of the necessary home terminal 40 to the other service vender 60. Thus, the permission information can be created appropriately regarding the cooperation with the other service vender 60. The service vender 60 is prohibited from browsing and controlling the irrelevant home terminal 40. Accordingly, it is possible to avoid privacy issues.

In brief, the communication controller 10 according to the present embodiment can create the affiliation object information appropriately in order to create the authorization information for enabling the other service provider to access only the necessary home terminal 40.

Besides, when the class indicates the user or the service, the communication controller 10 need not create both of the request authorization information and the notification authorization information. When the fundamental request information is associated with the class information, the communication controller 10 may create the request authorization information. When the fundamental notification information is associated with the class information, the communication controller 10 may create the notification authorization information.

In the aforementioned instance, the center server 20 functions as the communication controller 10. However, the communication controller 10 may be constituted by the center server 20 and the gateway 30. For example, the center server 20 may include the fundamental information storage unit 103 and the gateway 30 may include the authorization information storage unit 101, the request authorization information adding unit 104, and the notification authorization information adding unit 105.

The following is an explanation made to operation of the center server 20 and the gateway 30 in the above instance. Upon addition of the new home terminal 44 to the residence 71, the authentication information of the new home terminal 44 is added to the authentication database 304.

The node management service 302 refers to the class information of the new home terminal 44, and obtains the permission fundamental data corresponding to the class information from the fundamental data table 206 of the center server 20. Thereafter, the node management service 302 retrieves, from the authentication database 304, the terminal IDs of the home terminals 41 to 43 and the permission information of each of the home terminals 41 to 43. As described in the above, the node management service 302 adopts the terminal IDs of the home terminals 41 to 43 as the terminal ID of the permission fundamental data obtained from the fundamental data table 206.

In addition, when the new home terminal 44 is the target of the permission information for each of the home terminals 41 to 43, the node management service 302 adds the terminal ID of the home terminal 44 to the permission information. Subsequently, the permission information of the authentication database 304 is updated.

In this instance, since the gateway 30 performs registration of the newly added home terminal 44, processing load on the center server 20 can be reduced.

Besides, the gateway 30 may be configured to function as the communication controller 10.

The invention claimed is:

1. A communication controller used in a network system, said network system including:
   a first device configured to perform predetermined processing; and
   a second device configured to request said first device to perform the predetermined processing,
   wherein
said second device includes a request unit configured to send a request signal,
   the request signal including first sender information indicative of said second device selected as a sender of the request signal, request information indicative of processing which said second device requests said first device to perform, and first destination information indicative of said first device selected as a destination of the request signal,
   said first device including:

a function unit configured to, upon receiving the request signal, perform the processing indicated by the request information included in the request signal, and
a notification unit configured to send a notification signal,
said notification signal including second sender information indicative of said first device selected as a sender of the notification signal, notification information indicative of processing available in said function unit, and second destination information indicative of said second device selected as a destination of the notification signal,
said communication controller comprising an authorization information storage unit, a relay unit configured to relay between said first device and said second device via a network, a fundamental information storage unit, a request authorization information adding unit, and a notification authorization information adding unit,
said authorization information storage unit being configured to store request authorization information indicative of a combination of the first sender information, the request information, and the first destination information, and notification authorization information indicative of a combination of the second sender information, the notification information, and the second destination information,
said relay unit including a request signal relay module and a notification signal relay module,
said request signal relay module being configured to, upon receiving the request signal, check whether or not the request authorization information includes the same combination of the first sender information, the request information, and the first destination information as that indicated by the received request signal, and relay the received request signal upon acknowledging that the request authorization information includes the same combination of the first sender information, the request information, and the first destination information as that indicated by the received request signal,
said notification signal relay module being configured to, upon receiving the notification signal, check whether or not the notification authorization information includes the same combination of the second sender information, the notification information, and the second destination information as that indicated by the received notification signal, and relay the received notification signal upon acknowledging that the notification authorization information includes the same combination of the second sender information, the notification information, and the second destination information as that indicated by the received notification signal,
said fundamental information storage unit being configured to store fundamental notification information indicative of a correspondence relation between the notification information and first class information indicative of a class of said first device, and fundamental request information indicative of a correspondence relation between the request information and second class information indicative of a class of said second device,
said request authorization information adding unit comprising:
a second class information obtaining module configured to obtain the second class information of said second device which is newly added to the network;
a request information obtaining module configured to refer to the fundamental request information stored in said fundamental information storage unit, and obtain the request information corresponding to the second class information obtained by said second class information obtaining module;

a second sender information obtaining module configured to refer to the notification authorization information stored in said authorization information storage unit, and obtain the second sender information which is associated with the notification information indicative of the same processing as that indicated by the request information obtained by said request information obtaining module;

a request authorization information creation module configured to create the request authorization information which indicates a combination of the first sender information indicative of said second device newly added to the network, the request information obtained by said request information obtaining module, and the first destination information indicative of the same first device as that indicated by the second sender information obtained by said second sender information obtaining module; and a request authorization information storing module configured to store the request authorization information created by said request authorization information creation module in said authorization information storage unit, and said notification authorization information adding unit comprising:

a first class information obtaining module configured to obtain the first class information of said first device which is newly added to the network;

a notification information obtaining module configured to refer to the fundamental notification information stored in said fundamental information storage unit, and obtain the notification information corresponding to the first class information obtained by said first class information obtaining module;

a first sender information obtaining module configured to refer to the request authorization information stored in said authorization information storage unit, and obtain the first sender information which is associated with the request information indicative of the same processing as that indicated by the notification information obtained by said notification information obtaining module;

a notification authorization information creation module configured to create the notification authorization information which indicates a combination of the second sender information indicative of said first device newly added to the network, the notification information obtained by said notification information obtaining module, and the second destination information indicative of the same second device as that indicated by the first sender information obtained by said first sender information obtaining module; and a notification authorization information storing module configured to store the notification authorization information created by said notification authorization information creation module in said authorization information storage unit.

2. A communication controller as set forth in claim 1, further comprising:

a request authorization information updating unit; and
a notification authorization information updating unit,
wherein said request authorization information updating unit comprises a notification authorization information checking module, a second notification authorization information creation module, and a second notification authorization information storing module, said notification authorization information checking module being configured to check whether or not said authorization information storage unit stores the notification authorization information including a first combination, said first combination being defined as a combination of the second sender information indicative of the same first device as that indicated by the first destination information of the request authorization information created by said request authorization information creation module, and the notification information indicative of the same processing as that indicated by the request information of the request authorization information created by said request authorization information creation module, said second notification authorization information creation module being configured to create the notification authorization information indicative of a combination of the first combination and the second destination information indicative of the same second device as that indicated by the first sender information of the request authorization information created by said request authorization information creation module, upon acknowledging that said authorization information storage unit stores the notification authorization information including the first combination, and said second notification authorization information storing module being configured to store the notification authorization information created by said second notification authorization information creation module in said authorization information storage unit, and wherein said notification authorization information updating unit comprises a request authorization information checking module, a second request authorization information creation module, and a second request authorization information storing module, said request authorization information checking module being configured to check whether or not said authorization information storage unit stores the request authorization information including a second combination, said second combination being defined as a combination of the first sender information indicative of the same second device as that indicated by the second destination information of the notification authorization information created by said notification authorization information creation module, and the request information indicative of the same processing as that indicated by the notification information of the notification authorization information created by said notification authorization information creation module, said second request authorization information creation module being configured to create the request authorization information indicative of a combination of the second combination and the first destination information indicative of the same first device as that indicated by the second sender information of the notification authorization information created by said notification authorization information creation module, upon acknowledging that said authorization information storage unit stores the request authorization information including the second combination, and said second request authorization information storing module being configured to store the request authorization information created by said second request authorization information creation module in said authorization information storage unit.

3. A communication controller as set forth in claim 1, wherein
said second device includes the class of a user,
said request unit of said second device having the class of the user being configured to send the request signal including the first sender information indicative of identification information of the user,
said request authorization information creation module being configured to select the identification information of the user as the first sender information of the request authorization information when said second device has the class of the user,
the user including a normal user and a special user, and
the second class information indicative of the special user being configured to be associated in common with a part of the fundamental request information associated with the second class information indicative of the normal user.

4. A communication controller as set forth in claim 1, wherein
said second device includes the class of a service,
said request unit of said second device having the class of the service being configured to send the request signal including the first sender information defined by identification information of the service,
said second class information obtaining module being configured to, in response to a request of adding the service, obtain the second class information corresponding to the requested service, and
said request authorization information creation module being configured to select information defined by identification information of the service as the first sender information of the request authorization information when said second device has the class of the service.

5. A communication controller as set forth in claim 1, wherein
said second device includes the class of a cooperation service configured to perform cooperation between said first and second devices respectively placed in different residences,
said request unit of said second device having the class the cooperation service being configured to send the request signal including the first sender information defined by identification information of the cooperation service,
said fundamental request information being defined to indicate a correspondence relation between the second class information and cooperation object information which indicates whether or not the cooperation service is available,
said second class information obtaining module being configured to, in response to a request of implementing the cooperation service, obtain the second class information corresponding to the requested cooperation service,
said request authorization information creation module being configured to, upon acknowledging that the class of the second device is the cooperation service, refer to the fundamental request information stored in said fundamental information storage unit, and select said first device corresponding to the first class information available for the cooperation service from said first devices indicated by the second sender information obtained by said second sender information obtaining module,
said request authorization information creation module being configured to create the request authorization information indicative of a combination of the first sender information defined by identification information of the cooperation service, the request information obtained by said request information obtaining module, and the first destination information indicative of said first device selected by said request authorization information creation module.

6. A communication controller as set forth in claim 1, wherein
said second device includes the class of an affiliation service which is configured to be interacted between said first or second device and a center server of one of other service providers,
said request unit of said second device of which the class is the affiliation service being configured to send the request signal including the first sender information defined by identification information of the affiliation service,
said fundamental request information being defined to indicate a correspondence relation between the second class information and affiliation object information which indicates whether or not the affiliation service is available,
said second class information obtaining module being configured to, in response to a request of implementing the affiliation service, obtain the second class information corresponding to the requested affiliation service,
said request authorization information creation module being configured to, upon acknowledging that the class of the second device is the affiliation service, refer to the fundamental request information stored in said fundamental information storage unit, and select said first device corresponding to the first class information available for the affiliation service from said first devices indicated by the second sender information obtained by said second sender information obtaining module,
said request authorization information creation module being configured to create the request authorization information indicative of a combination of the first sender information defined by identification information of the affiliation service, the request information obtained by said request information obtaining module, and the first destination information indicative of said first device selected by said request authorization information creation module.

7. A communication controller as set forth in claim 1, wherein
the network system includes a center server configured to manage said first device and said second device, and a gateway configured to relay communication between said center server and said first device as well as said second device,
said center server being provided with said fundamental information storage unit, and
said gateway being provided with said authorization information storage unit, said request authorization information adding unit, and said notification authorization information adding unit.

8. A network system comprising:
a first device configured to perform predetermined processing;
a second device configured to request said first device to perform the predetermined processing; and
a communication controller configured to control communication between said first device and said second device, wherein
said second device includes a request unit configured to send a request signal,
the request signal including first sender information indicative of said second device selected as a sender of the request signal, request information indicative of processing which said second device requests said first device to perform, and first destination information indicative of said first device selected as a destination of the request signal,
said first device including:
a function unit configured to, upon receiving the request signal, perform the processing indicated by the request information included in the request signal, and
a notification unit configured to send a notification signal,
said notification signal including second sender information indicative of said first device selected as a sender of the notification signal, notification information indicative of processing available in said function unit, and second destination information indicative of said second device selected as a destination of the notification signal,
said communication controller comprising an authorization information storage unit, a relay unit configured to relay between said first device and said second device via a network, a fundamental information storage unit, a request authorization information adding unit, and a notification authorization information adding unit,
said authorization information storage unit being configured to store request authorization information indicative of a combination of the first sender information, the request information, and the first destination information, and second authorization information indicative of a combination of the second sender information, the notification information, and the second destination information,
said relay unit including a request signal relay module and a notification signal relay module,
said request signal relay module being configured to, upon receiving the request signal, check whether or not the request authorization information includes the same combination of the first sender information, the request information, and the first destination information as that indicated by the received request signal, and relay the received request signal upon acknowledging that the request authorization information includes the same combination of the first sender information, the request information, and the first destination information as that indicated by the received request signal,
said notification signal relay module being configured to, upon receiving the notification signal, check whether or not the notification authorization information includes the same combination of the second sender information, the notification information, and the second destination information as that indicated by the received notification signal, and relay the received notification signal upon acknowledging that the notification authorization information includes the same combination of the second sender information, the notification information, and the second destination information as that indicated by the received notification signal,
said fundamental information storage unit being configured to store fundamental notification information indicative of a correspondence relation between the notification information and first class information indicative of a class of said first device, and fundamental request information indicative of a correspondence relation between the request information and second class information indicative of a class of said second device,
said request authorization information adding unit comprising:
a second class information obtaining module configured to obtain the second class information of said second device which is newly added to the network;
a request information obtaining module configured to refer to the fundamental request information stored in said fundamental information storage unit, and obtain the request information corresponding to the second class information obtained by said second class information obtaining module;
a second sender information obtaining module configured to refer to the notification authorization information stored in said authorization information storage unit, and obtain the second sender information which is associated with the notification information indicative of the same processing as that indicated by the request information obtained by said request information obtaining module;
a request authorization information creation module configured to create the request authorization information which indicates the combination of the first sender information indicative of said second device newly added to the network, the request information obtained by said request information obtaining module, and the first destination information indicative of the same first device as that indicated by the second sender information obtained by said second sender information obtaining module; and
a request authorization information storing module configured to store the request authorization information created by said request authorization information creation module in said authorization information storage unit, and
said notification authorization information adding unit comprising:
a first class information obtaining module configured to obtain the first class information of said first device which is newly added to the network;
a notification information obtaining module configured to refer to the fundamental notification information stored in said fundamental information storage unit, and obtain the notification information corresponding to the first class information obtained by said first class information obtaining module;
a first sender information obtaining module configured to refer to the request authorization information stored in said authorization information storage unit, and obtain the first sender information which is associated with the request information indicative of the same processing as that indicated by the notification information obtained by said notification information obtaining module;
a notification authorization information creation module configured to create the notification authorization information which indicates the combination of the second sender information indicative of said first device newly added to the network, the notification information obtained by said notification information obtaining module, and the second destination information indicative of the same second device as that indicated by the first sender information obtained by said first sender information obtaining module; and
a notification authorization information storing module configured to store the notification authorization information created by said notification authorization information creation module in said authorization information storage unit.

\* \* \* \* \*